(12) United States Patent
Sinha et al.

(10) Patent No.: US 7,941,408 B2
(45) Date of Patent: May 10, 2011

(54) SYSTEM, STRUCTURE, INTERFACE, AND SEMANTICS FOR IMPLEMENTING ROW VERSIONS: ACCESSING PAST VERSIONS OF A DATA ITEM

(75) Inventors: Bipul Sinha, Foster City, CA (US); Vivekanandhan Raja, Foster City, CA (US); Amit Ganesh, San Jose, CA (US); Kenneth R. Jacobs, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 309 days.

(21) Appl. No.: 10/934,079

(22) Filed: Sep. 3, 2004

(65) Prior Publication Data

US 2005/0120062 A1    Jun. 2, 2005

Related U.S. Application Data

(60) Provisional application No. 60/500,509, filed on Sep. 6, 2003, provisional application No. 60/500,510, filed on Sep. 6, 2003.

(51) Int. Cl.
 G06F 7/00  (2006.01)
 G06F 17/00 (2006.01)

(52) U.S. Cl. ...................................... 707/685
(58) Field of Classification Search .................. 707/203, 707/2, 201, 200, 167, 15
 See application file for complete search history.

(56) References Cited

U.S. PATENT DOCUMENTS

| | | | |
|---|---|---|---|
| 5,347,653 A * | 9/1994 | Flynn et al. .................... 707/695 |
| 5,504,879 A | 4/1996 | Eisenberg et al. |
| 5,613,113 A * | 3/1997 | Goldring ....................... 707/202 |
| 5,701,457 A | 12/1997 | Fujiwara |
| 5,890,166 A * | 3/1999 | Eisenberg et al. ............ 707/203 |
| 5,950,210 A | 9/1999 | Nelson |
| 6,125,371 A | 9/2000 | Bohannon et al. |
| 6,671,689 B2 | 12/2003 | Papierniak |
| 6,754,657 B2 * | 6/2004 | Lomet .............................. 707/8 |
| 6,882,994 B2 | 4/2005 | Yoshimura et al. |
| 7,225,208 B2 | 5/2007 | Midgley et al. |
| 7,233,947 B2 | 6/2007 | Lomet |
| 7,334,004 B2 | 2/2008 | Ganesh et al. |
| 2002/0007363 A1 | 1/2002 | Vaitzblit |
| 2003/0154191 A1 * | 8/2003 | Fish et al. ........................ 707/2 |

(Continued)

OTHER PUBLICATIONS

Bolour, A. et al. "The Role of Time in Information Processing: A Survey" ACM SIGMOD Record, Apr. 1982, vol. 12, No. 3, pp. 27-50.
Bolour, A. et al. "The Role of Time in Information Processing: A Survey" ACM SIGART Bulletin, Apr. 1982, Issue 80, pp. 28-46.

(Continued)

*Primary Examiner* — Kavita Padmanabhan
(74) *Attorney, Agent, or Firm* — Vista IP Law Group, LLP.

(57) ABSTRACT

Disclosed is a mechanism, system, interface, and process to allow specification of a new table decoration clause to obtain one or more past version of one or more data items. The version query provides for a direct interface to get multiple versions of the row(s). In addition, information about the past versions can be retrieved and displayed along with the past versions. Also disclosed are algorithms, mechanisms, and processes that are employed to implement a query upon past versions. In one approach, the version query can be defined as either "rowid"-based access or non-rowid based access. With rowid based access, a given rowid is used to identify the data for which past versions are desired. Also disclosed is a process for determining one or more life intervals when given a key.

29 Claims, 13 Drawing Sheets

U.S. PATENT DOCUMENTS

| | | | |
|---|---|---|---|
| 2004/0030954 A1* | 2/2004 | Loaiza et al. | 714/20 |
| 2004/0088334 A1* | 5/2004 | Klein | 707/203 |
| 2005/0086195 A1 | 4/2005 | Tan et al. | |
| 2005/0114409 A1 | 5/2005 | Sinha et al. | |
| 2005/0120062 A1 | 6/2005 | Sinha et al. | |
| 2005/0120064 A1 | 6/2005 | Sinha et al. | |

OTHER PUBLICATIONS

Clifford, J. "Natural Language Querying of Historical Databases" Computational Linguistics, Dec. 1988, vol. 14, No. 4, pp. 10-34.

Derthick, M. et al. "Data Exploration across Temporal Contexts" Proceedings of the 5th International Conference on Intelligent User Interfaces, New Orleans, LA, 2000, pp. 60-67.

Lahiri, T. et al. "Fast-Start: Quick Fault Recovery in Oracle" Proceedings of the 2001 ACM SIGMOD International Conference on Management of Data (SIGMOD '01), Santa Barbara, CA, May 21-24, 2001, pp. 593-598.

Mohan, C. et al. "ARIES: A Transaction Recovery Method Supporting Fine-Granularity Locking and Partial Rollbacks Using Write-Along Logging" ACM Transactions on Database Systems (TODS), Mar. 1992, vo. 17, No. 1, pp. 94-162.

Nakayama, K. et al. "I-Regular Expression: Regular Expression with Continuous Interval Constraints" Conference on Information and Knowledge Management (CIKM 97), Las Vegas, NV, 1997, pp. 40-50.

Office Action dated Jan. 18, 2007 for U.S. Appl. No. 10/933,832.
Office Action dated Nov. 7, 2007 for U.S. Appl. No. 10/933,832.
Office Action dated Jan. 29, 2007 for U.S. Appl. No. 10/933,828.
Office Action dated Sep. 25, 2007 for U.S. Appl. No. 10/933,828.
Office Action dated Jan. 29, 2008 for U.S. Appl. No. 10/933,832.
Office Action dated May 14, 2008 for U.S. Appl. No. 10/933,832.
Office Action dated Nov. 18, 2008 for U.S. Appl. No. 10/933,832.
Office Action dated Oct. 16, 2008 for U.S. Appl. No. 10/933,828.
Office Action dated May 28, 2009 for U.S. Appl. No. 10/933,828.
Office Action dated May 21, 2009 for U.S. Appl. No. 10/933,832.
Varman et al., "Optimal Storage and Access to Multiversion Data", Proc. ICCI'94, 1994, pp. 1605-1620.
Non-Final Office Action dated Dec. 16, 2009 for U.S. Appl. No. 10/933,832.
Non-Final Office Action dated Dec. 16, 2009 for U.S. Appl. No. 10/933,828.
Final Office Action dated Jul. 27, 2010 for U.S. Appl. No. 10/933,828.
Final Office Action dated Nov. 18, 2010 for U.S. Appl. No. 10/933,832.
Notice of Allowance dated Mar. 4, 2011 for U.S. Appl. No. 10/933,828.

* cited by examiner

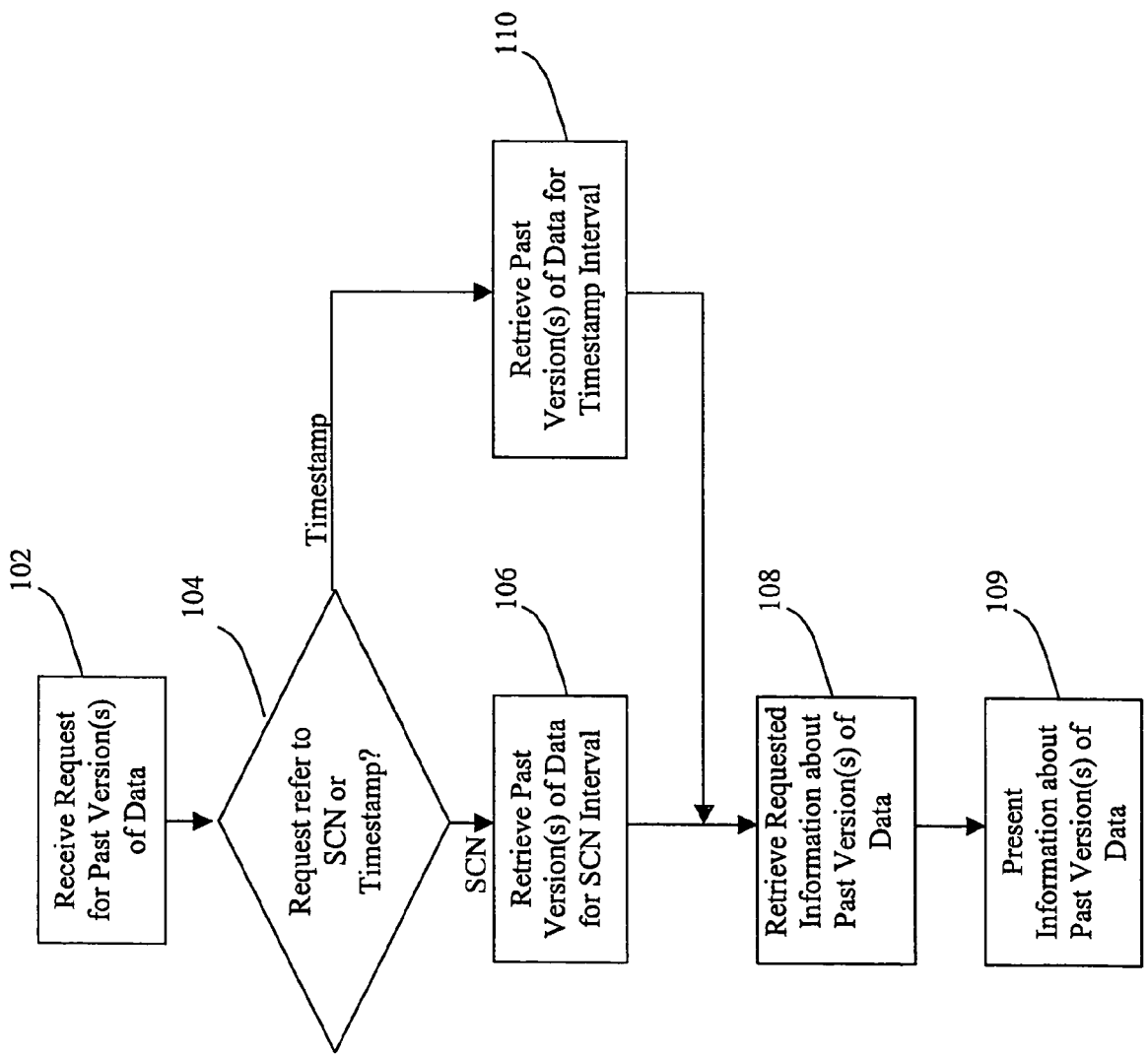

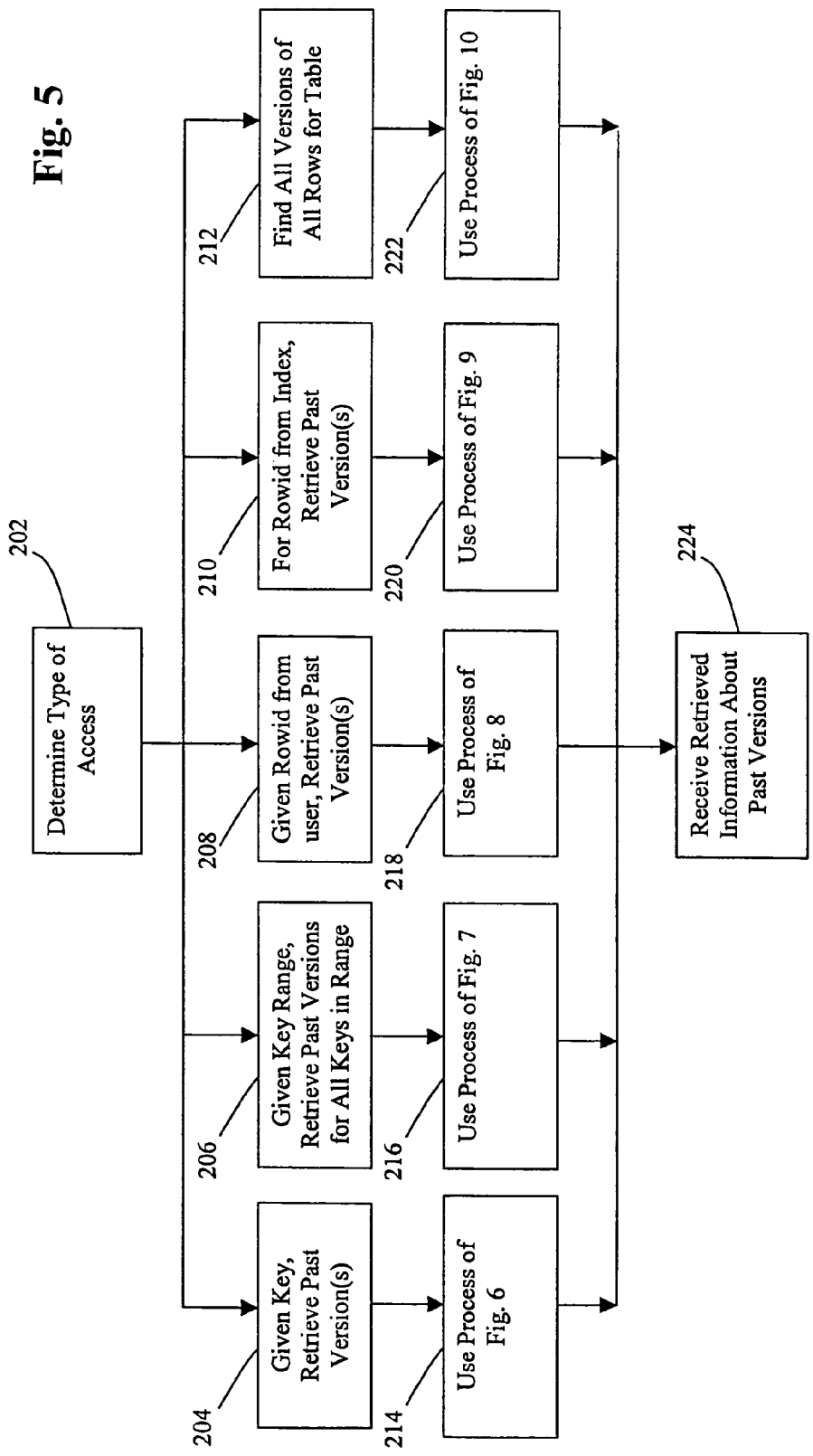

SYSTEM, STRUCTURE, INTERFACE, AND SEMANTICS FOR IMPLEMENTING ROW VERSIONS: ACCESSING PAST VERSIONS OF A DATA ITEM

CROSS-REFERENCE TO RELATED APPLICATIONS

The present application claims the benefit of U.S. Provisional Patent Application No. 60/500,509, entitled "System, Structure, Interface, and Semantics For Implementing Row Versions: Accessing Past Versions Of A Data Item" and U.S. Provisional Patent Application No. 60/500,510, entitled "Method and Mechanism For Row Versioning", both filed on Sep. 6, 2003, the contents of which are incorporated herein by reference in their entirety for all purposes as if fully set forth herein.

This application is related to co-pending U.S. application Ser. No. 10/933,828, entitled "Method and Mechanism for Determining Life Intervals For A Key In An Index", and U.S. application Ser. No. 10/933,832, entitled "Method and Mechanism For Row Versioning", both filed on even date herewith, and both of which are incorporated herein by reference in their entirety.

This application is related to U.S. application Ser. No. 10/866,333, entitled "Querying Past Versions of Data in a Distributed Database", filed Jun. 10, 2004; is related to U.S. Provisional Patent Application No. 60/570,769 filed May 12, 2004, entitled "Querying Past Versions of Data in a Distributed Database"; is related to U.S. Pat. No. 6,631,374 issued Oct. 7, 2003, entitled "System and method for providing fine-grained temporal database access"; is related to U.S. patent application Ser. No. 10/364,209 filed Feb. 10, 2003, entitled "Method And Mechanism For Identifying Last Transaction On A Row of Data"; is related to U.S. patent application No. 10/364,065 filed Feb. 10, 2003, entitled "Method And Mechanism For Rolling Back A Transaction On A Row of Data"; is related to U.S. patent application No. 10/325,211 filed Dec. 18, 2002, entitled "Method and Apparatus For Accessing Data As It Existed At A Previous Point In Time"; the contents of all of which are incorporated herein in their entirety for all purposes as if fully set forth herein.

COPYRIGHT NOTICE

This document contains computer code and other material which are subject to copyright protection. The copyright owner has no objection to the facsimile reproduction of these materials as they appear in the United States Patent and Trademark patent files or records, but otherwise reserves all copyright rights whatsoever.

BACKGROUND AND SUMMARY

The invention relates to computer systems, and more particularly to a method and mechanism for accessing past versions of data in a database system.

In database systems, a "transaction" normally refers to an atomic set of operations performed against a database. The transaction may access, create, modify, or delete database data or database metadata while it is being processed. A "commit" occurs when the transaction has completed its processing and any changes to the database by the transaction are ready to be "permanently" implemented in the database system. Because the transaction is atomic, all actions taken by the transaction must be committed at the same time.

In conventional systems, a committed transaction comprises a set of one or more permanent changes that are made against a set of records in a database system. Since the committed changes for a transaction are normally permanent, the transactions themselves are not normally reversible. Therefore, most database systems do not have an easily accessible way to access and view past versions of a data item.

Some database systems allow an archived version of a database system to be restored to a particular point in time, usually by restoring the entire database as of the time that the "back up" archive was made. However, this approach restores an entire database, even though only a small set of one or more transactions may need to be undone or compensated for to correct a data error made by the transactions. This is a highly inefficient approach if only a relatively small number of changes or transactions must be corrected.

One solution that has been provided is to undo, reverse, or compensate for a committed transaction in a database system, as described in co-pending U.S. application Ser. No. 10/364,065, filed on Feb. 10, 2003, which is hereby incorporated by reference in its entirety. In addition a solution has been proposed for identifying the one or more transactions that have modified or created an object, such as a row of data, in a database system, as described in co-pending U.S. application Ser. No. 10/364,209, filed on Feb. 10, 2003, which is hereby incorporated by reference in its entirety.

Embodiments of the present invention provide an improved interface, system, method, and mechanism for accessing past versions of a data item. In particular, embodiments of the invention provide a method, system, and medium for obtaining versions of data over a time interval.

In one embodiment, a mechanism is provided to allow specification of a new table decoration clause to obtain one or more past version of one or more data items. The version query provides for a direct interface to get multiple versions of the row(s). In addition, information about the past versions can be retrieved and displayed along with the past versions. Such information could include start time/SCN values, end time/SCN values, transaction identifier for the transaction that produces the version, and operation that resulted in the version.

Another embodiment of the invention includes algorithms, mechanisms, and processes that are employed to implement a query upon past versions. In one embodiment, the version query can be defined as either "rowid"-based access or non-rowid based access. With rowid based access, a given rowid is used to identify the data for which past versions are desired. Even within these two broad categories, there may be subcategories of rowid-based or non-rowid-based access to past versions of data. For example, with rowid-based access, the rowid may be provided by a user or from an index. With non-rowid-based access, there may be access initiated by identification of either a key, range of keys, block or from an entire table.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

FIG. 1 shows a flowchart of a process to implement a version query according to an embodiment of the invention.

FIG. 5 shows a flowchart of a process to execute a version query according to an embodiment of the invention.

DETAILED DESCRIPTION

Figure 2A:
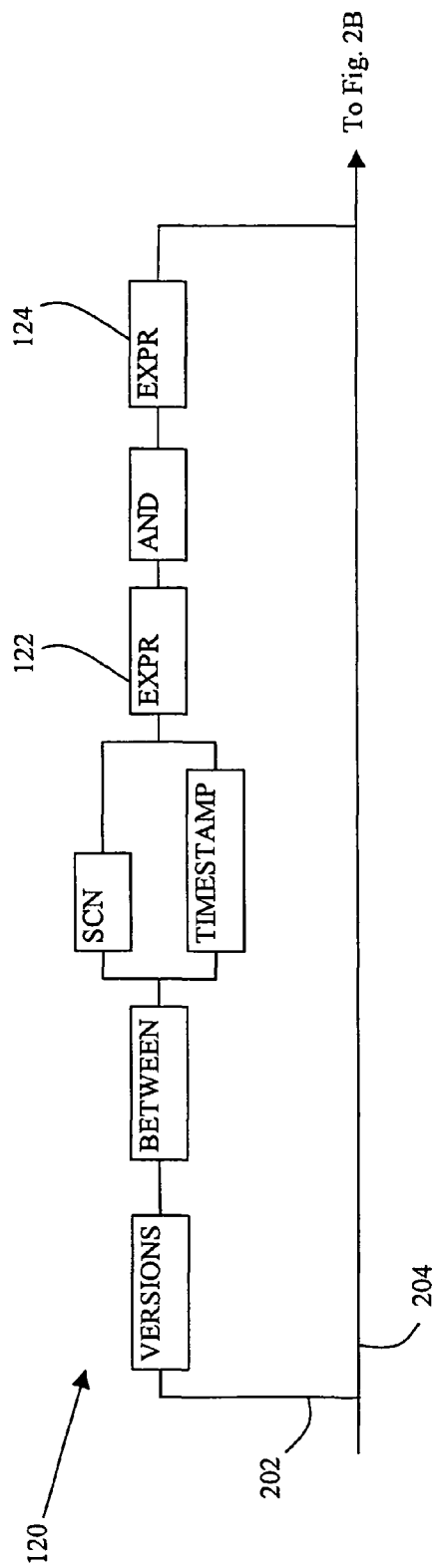
FIG. 2A shows an example syntactic extension to SQL that can be used to implement a version query according to an embodiment of the invention.

Embodiments of the present invention provide an improved interface, system, method, and mechanism for accessing past versions of a data item. In particular, embodiments of the invention provide a method, system, and medium for obtaining versions of data over a time interval.

A mechanism is provided to allow specification of a new table decoration clause to obtain one or more past version of one or more data items. The version query provides for a direct interface to get multiple versions of the row(s) as described above. It also provides for a way to audit the rows of a table and get information about the transactions that changed the rows and also times when it was changed. Using the transaction id user can do transaction mining through log miner or, undo transaction mining capabilities to get complete information about the transaction.

FIG. 1 shows a flowchart of a process for implementing an embodiment of the invention. At 102, a request is received for past version(s) of the Data. In one embodiment, when implemented with the structured query language (SQL), the new table decoration clause is embodied as "VERSIONS" in the "FROM" clause of the select statement of SQL queries. The table decoration clause allows identification of an interval for which past versions are desired.

A query on a table decorated with VERSIONS clause will be referred to herein as a "version query". In one embodiment, the version query will return versions of the rows across transactions only.

The interval may be a closed interval, (e.g., specifying a start and end) an open interval (e.g., specifying just a start point or just an end point), or an interval having default start and end values (e.g., default maximum value and minimum value). For example, the default minimum value may be set at the time at which no more log records are available to obtain past versions and the default maximum value may be set at the time at which the versions query is executed. Alternatively, a continuing query may be performed in which the maximum time is continuously extended as new commits occur in the system.

According to a present embodiment, either logical time or temporal time may be used to specify the time interval for the versions query. An example of logical time is the SCN (system commit number or system change number), which is a monotonically increasing number that is associated with every new commit and/or change performed in the system. Timestamps can be used to identify and specify temporal time. The system timestamp corresponds to a specific time at which a recorded event occurs. In alternate embodiment, other time-related parameters may be used to specify a time interval.

At 104, a determination is made whether the request for past versions refers to an interval based upon SCN values or timestamps. If the request is based upon SCN values, then past versions are retrieved based upon the specified SCN interval (106). If the request is based upon timestamp values, then past versions are retrieved based upon the specified time interval (110).

A query on a table with VERSIONS clause produces all the versions of all the data in the specified interval period (108). At 109, information about the past versions of the data is presented. Examples of such information include: (a) the past version of the data; (b) identification of the transaction that created the version of the data; (c) start time/SCN of that version of the data; (d) end time/SCN for the version; and/or (e) the type of operation that created the past version of the data.

The query will identify all versions that exist or ever existed in the specified interval. In some cases, the interval may extend beyond the time period for which log records (e.g., undo log records) are maintained sufficient to obtain the past versions. If so, then the query will obtain all versions to a point back in time for which appropriate log records exist.

If a closed interval is specified, the information is retrieved and presented about the past versions within the specified closed interval from the specified begin point to the specified end point. If an open interval with just a start point is specified, then all past versions from the begin point to the present are retrieved. If an open interval with just an end point is specified, then all past versions from the end point backwards in time to the limits of maintained records are retrieved. If an open interval with neither a start nor end point is specified, then all past versions from the present backwards in time to the limits of maintained records are retrieved. The query will identify all versions that exist or ever existed between the time the query was issued and the point back in time that is the limit of log retention.

FIG. 2A shows an example syntactic extension 120 to a SQL query that can be used to implement an embodiment of the inventions. Path 202 implements a versions query and path 204 results in a normal query.

With a versions query, an interval can be specified, based upon either SCN values or timestamp values, from a begin point 122 to an end point 124.

The default VERSIONS clause can be specified as:

---

VERSIONS BETWEEN {SCN|TIMESTAMP} MINVALUE AND MAXVALUE.

---

A MINVALUE and MAXVALUE can be specified in the BETWEEN clause to indicate a lower and upper bound for time/scn respectively. In one embodiment, the bounds can be time/scn constrained, selected to be infinite, bounded up to the current query, or as defined by the "AS OF" clause as described below.

Figure 2B:
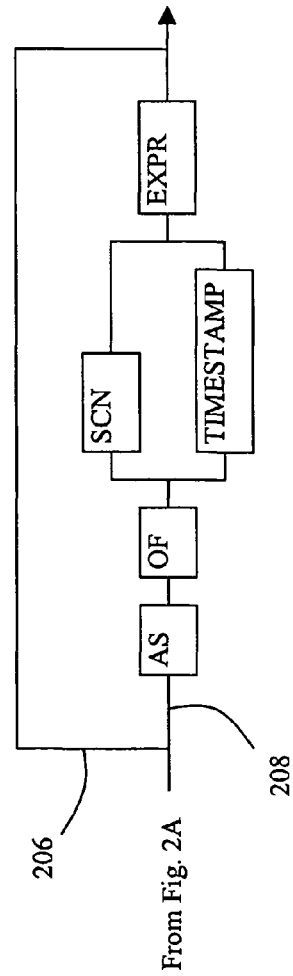
FIG. 2B shows an example extension that can be used to specify an as-of time/scn for a version query according to an embodiment of the invention.

FIG. 2B shows an extension that can be used to specify a query that is executed as if it is being executed as of a particular SCN/timestamp. Path 208 implements such a query and path 206 results in a normal query. The clause can be expressed as the following:

---
[VERSIONS BETWEEN {SCN | TIMESTAMP} expr AND expr] AS OF {SCN | TIMESTAMP} expr
---

An exemplary approach for implementing such a query is disclosed in co-pending U.S. patent application Ser. No. 10/325,211 filed Dec. 18, 2002, entitled "Method and Apparatus For Accessing Data As It Existed At A Previous Point In Time", which is hereby incorporated by reference in its entirety.

Different combinations of these query extensions can be applied. For example, a normal query would clearly follow paths 204 and 206. A versions query executed from the present time would follow paths 202 and 206. But a versions query that is to be executed as of a particular point in time would follow paths 202 and 206.

As stated above, the invention enables the users to decorate a table of a SQL query statement to retrieve all the versions of all the rows of the table that exist or, ever existed between the time the query was issued and the point back in time that is the undo_retention seconds. The results of a query with a where clause on a table decorated with VERSIONS is as if the where clause were applied to the versions of the rows produced as described above. The VERSIONS clause does not change the plan of the query. For example, if a query on a table uses index access method then the same query on the same table now decorated with VERSIONS clause will still use the index access method. The versions of the row(s) returned by the version query will be versions of the row(s) across transactions. The VERSIONS clause has no effect on the transactional behavior of a query. This means that a query on a table with VERSIONS clause will still inherit the query environment of the ongoing transaction. In one embodiment, DML and DDL operations can use the present approach within sub-queries.

The row version query will retrieve all the committed versions of the selected rows. Changes made by the current active transaction will not be returned. The versions query retrieves all incarnations of the row(s). This essentially means that versions returned will include delete and subsequent re-insert versions of the row(s).

The VERSIONS clause is appended by a BETWEEN clause that will take a lower and an upper bound time/scn to define a time interval of the VERSIONS clause. A query with a BETWEEN clause on a table decorated with VERSIONS clause produces versions of all the rows that exist or, ever existed in the time/scn interval of the BETWEEN clause. In one embodiment, if the log record retention time (e.g., for undo log records) is smaller than the lower bound time/scn of the BETWEEN clause then query will retrieve versions up to the log record retention time only. The time interval of the BETWEEN clause can be specified as an SCN interval or, a wall clock interval. This time interval will be closed at both the lower and the upper bound.

Figure 3:
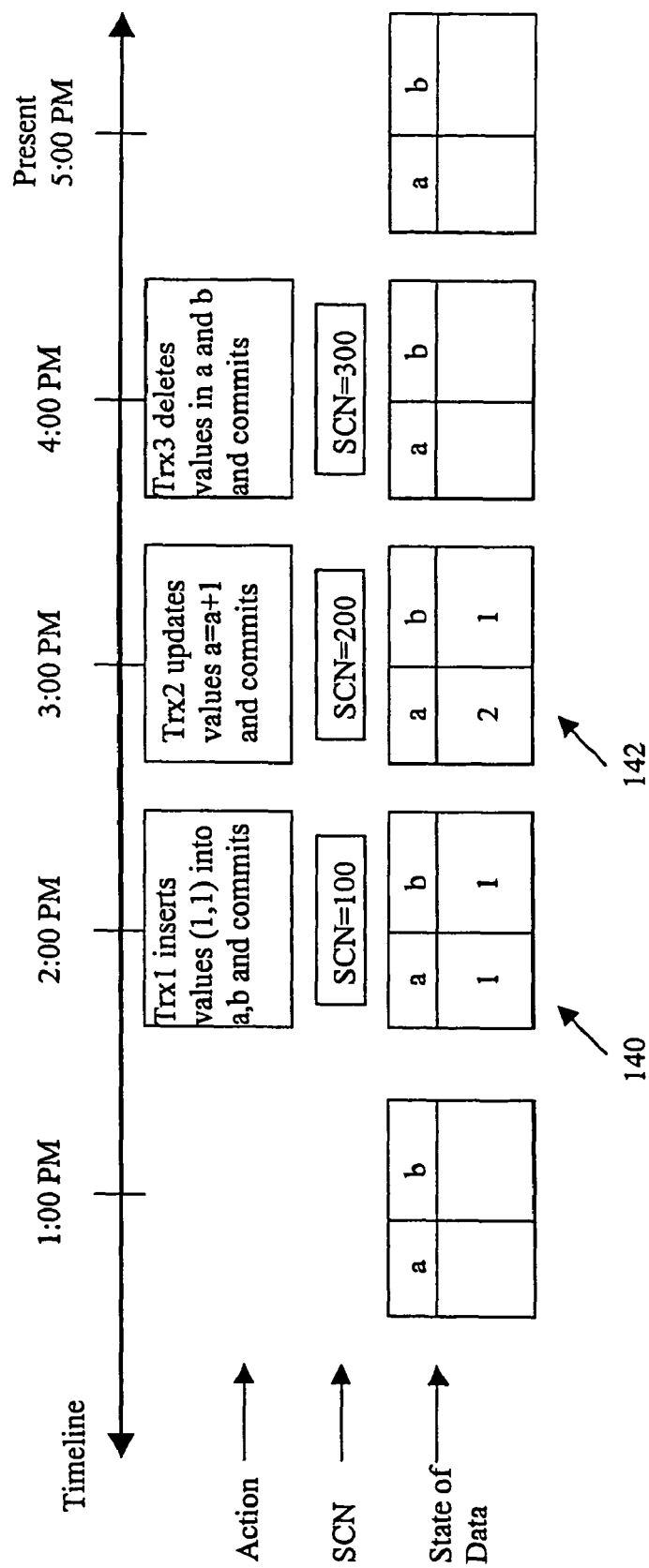
FIG. 3 shows an example timeline to illustrate an embodiment of the invention.

An illustrative example will now be provided of the present embodiment of the invention. FIG. 3 shows an example timeline of the state of two items of data referred to as "a" and "b". As shown in this timeline, a transaction identified as Trx1 inserted the value "1" into both data items a and b, and this transaction committed at 2:00 PM and is assigned a SCN value of 100. The state of these data items as of 2:00 PM is shown in box 140. Another transaction, identified as Trx2, updates the data item a (a=a+1) so that data item a now has the value of "2". Transaction Trx2 commits at 3:00 PM with a SCN value of 200. The state of data items a and b as of 3:00 PM is shown in box 142. A transaction identified as Trx3 deletes data items a and b and commits at time 4:00 PM and a SCN value of 300.

The following is an example of a query decorated with VERSIONS and BETWEEN clauses that is posed against a table containing these data items:

---
SQL> SELECT a, b FROM Table_a_b VERSIONS BETWEEN
TIMESTAMP TO_TIMESTAMP (2:30 PM) AND
TO_TIMESTAMP (3:30 PM);
---

This version query retrieves the past versions of the data items a and b from the time interval defined by a start point at 2:30 PM and an end point at 3:30 PM. Referring to FIG. 3, it can be seen that at the start point of 2:30 PM, data items (a,b) had the values (1,1) based upon the insert performed by transaction Trx1 at 2:00 PM. However, at 3:00 PM, transaction Trx2 has updated the value for data item a such that data items (a,b) had the values (2,1). No other changes occurred to these data items by the end point of the time interval at 3:30 PM. Therefore, there were two past versions of the identified data items, which produces an output to the version query as follows:

| a | b |
|---|---|
| 2 | 1 |
| 1 | 1 |

2 rows retrieved

In this example output, the row (2,1) is the most recent version of the data items within the specified time interval. The row (1,1) is the next most recent version of the data items within the time interval.

In addition to just the past versions of the data items, in one embodiment, the version query will return validity range (i.e. the start and the end time) of the version, identification of the transaction that created this version, and the operation that produced this version. The validity range will be closed at the lower bound and open at the upper bound. This means that a given version is valid for all time t where VERSIONS_STARTTIME<=t<VERSIONS_ENDTIME. These information will be returned as values of the following six pseudo columns:

- VERSIONS_STARTTIME—start time/date for the version
- VERSIONS_STARTSCN—start SCN for the version
- VERSIONS_ENDTIME—end time/date for the version
- VERSIONS_ENDSCN—end SCN for the version
- VERSIONS_XID—identifier of transaction that created version
- VERSIONS_OPERATION—operation that produced version: 'I'—INSERT, 'D'—DELETE, and 'U'

These pseudo columns can be specified as part of the where clause to retrieve the specified versions of the row(s). This selection of the versions of the row(s) essentially enables the users to sample events based on visible versions of the database.

The start time/scn specifies the creation time of the version. This time will, however be NULL if the version was created before the lower bound time of the time interval specified with the versions clause or, before the undo_retention time if no interval was specified.

The end time/scn specifies the expiry time of the version. This time will be NULL in several circumstances. A first example circumstance is if the version was still alive as of the statement time/scn. The statement time/scn is either AS OF time/scn if the AS OF clause is specified or, the default read SCN of the query. A second example circumstance is if it is a deleted version of the row, as shown in the example above.

The version query returns the deleted version of the row(s) if any. The deleted version of a row will be represented, as the version of the row before the delete and operation code returned in the VERSIONS_OPERATION pseudo column will be "D". The upper bound validity range of the deleted version is indeterminate and hence will be represented as NULL.

As described above, a query on a table decorated with both the VERSIONS and the BEWEEN clauses produces all the versions of all the rows that exist or, ever existed in the time interval of the BETWEEN clause. This essentially means that only those versions will be returned whose validity range intersects with the time interval of the BETWEEN clause. Here are some examples:

```
SQL> SELECT versions_starttime "START_TIME", versions_endtime
"END_TIME", a, b
FROM Table_a_b VERSIONS BETWEEN TIMESTAMP
MINVALUE AND MAXVALUE;
```

This version query finds all values of a and b that has ever existed (within the limits of the log records) and outputs the data values as well as the VERSIONS_STARTTIME and VERSIONS_ENDTIME for the past versions. Referring to FIG. 3, it can be seen that at the present time, (5:00 PM) there are no existing versions of data items a and b. At 4:00 PM, a transaction Trx3 committed which deleted data items a and b. At 3:00 PM, transaction Trx2 committed which updated the value for data item a such that data items (a,b) had the values (2,1). At 2:00 PM, transaction Trx1 committed which inserted the values (1,1) into data items a and b, respectively. Assume that no other past version of the data items are accessible within the scope of the maintained log records.

| START_TIME | END_TIME | a | b |
|---|---|---|---|
| 4:00 PM |  | 2 | 1 |
| 3:00 PM | 4:00 PM | 2 | 1 |
| 2:00 PM | 3:00 PM | 1 | 1 |

3 rows selected

In this example, output, the row having the following values:

| 4:00 PM | NULL | 2 | 1 |
|---|---|---|---| corresponds to the delete operation that was performed by Transaction Trx3. Even though the values for a and b have been deleted, in this example, it was chosen to place the last existing values for these data items. It is noted that the last the NULL value for the END_TIME indicates that this was the existing version at the query time.

The row having the following values:

| 3:00 PM | 4:00 PM | 2 | 1 |
|---|---|---|---| corresponds to the version of the data items a and b having values of (2,1) as produced by transaction Trx2. This transaction committed at time 3:00 PM, and therefore, the start time for this version of the data items is at 3:00 PM. The next transaction that modified these values is transaction Trx3 at 4:00 PM, and therefore the end point of this version of the data items is at 4:00 PM.

The row having the following values:

| 2:00 PM | 3:00 PM | 1 | 1 |
|---|---|---|---| corresponds to the version of the data items a and b having values of (1,1) as produced by transaction Trx1. This transaction committed at time 2:00 PM, and therefore, the start time for this version of the data items is at 2:00 PM. The next transaction that modified these values is transaction Trx2 at 3:00 PM, and therefore the end point of this version of the data items is at 3:00 PM.

If there had been a version that existed prior to the 2:00 PM commit by transaction Trx1, and that version had been created before the retention time of the log records, then a row would have been output for the pre-existing version with a NULL value in the START_TIME for the last version indicating that this version was created at a time before the log retention time.

The following version query seeks all the pseudo column values for the past versions of the example of FIG. 3 that has been described, i.e., VERSIONS_STARTTIME, VERSIONS_STARTSCN, VERSIONS_ENDTIME, VERSIONS_ENDSCN, VERSIONS_XID, and VERSIONS_OPERATION:

```
SQL> SELECT a, b, versions_xid "XID", versions_startscn
"START_SCN",
versions_endscn "END_SCN", versions_starttime
"START_TIME",
versions_endtime "END_TIME", versions_operation
"OPERATION" FROM
Table_a_b VERSIONS BETWEEN SCN MINVALUE AND
MAXVALUE;
```

Figure 4:
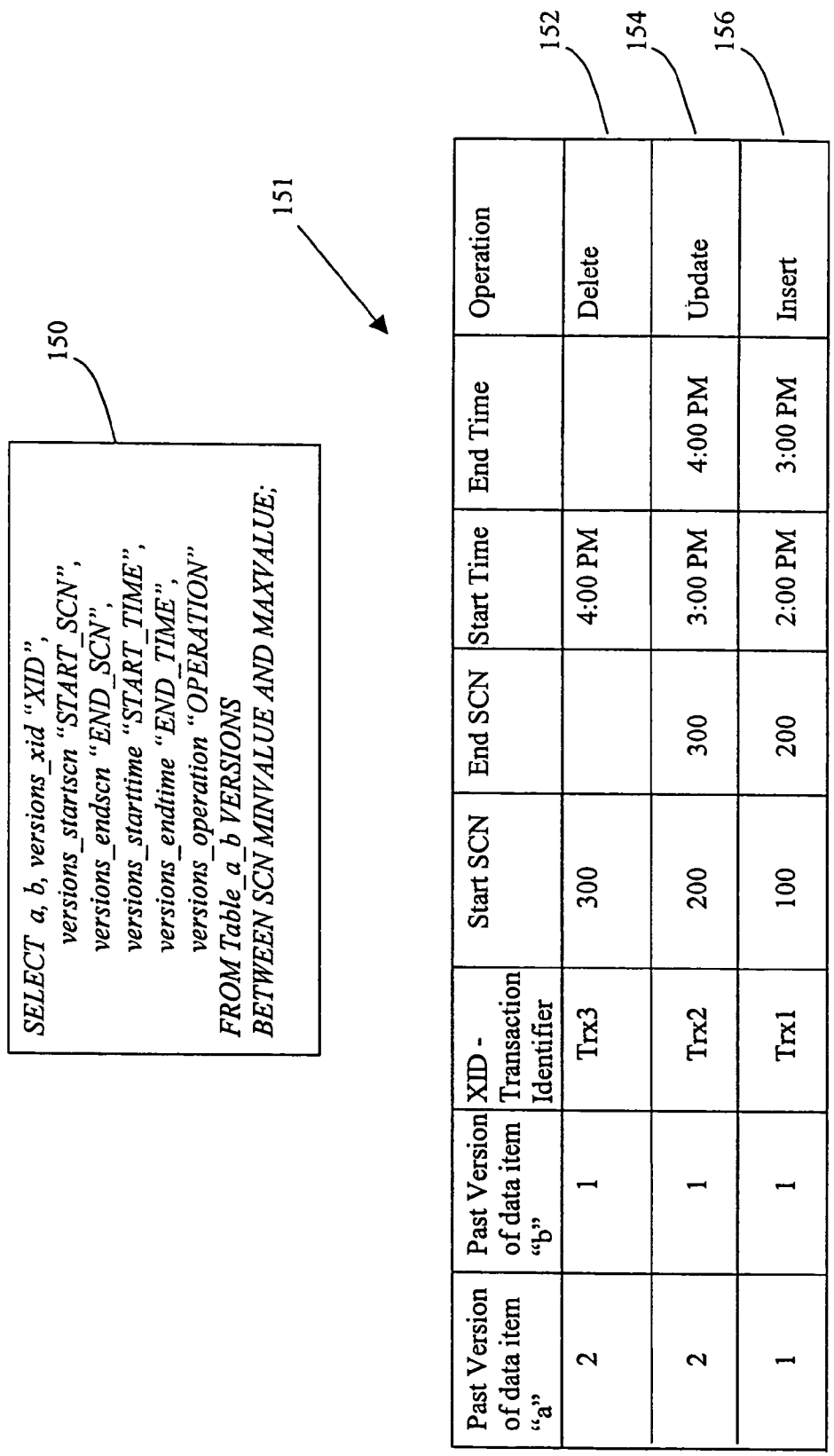
FIG. 4 shows an example output display for a particular version query made upon the data shown in FIG. 3.

This version query is reproduced in FIG. 4 at box 150. Table 151 shows the response to this version query based upon a query to the state shown in FIG. 3, with the requested pseudo columns each in a different column within table 151.

Row 152 in this example has the following values:

| 2 | 1 | Trx3 | 300 | NULL | 4:00 PM | NULL | Delete |
|---|---|---|---|---|---|---|---|

This row corresponds to the delete operation that was performed by Transaction Trx3. Even though the values for a and b have been deleted by Trx3, in this example, it was chosen to place the last existing values for these data items in the first two columns. It is noted that this is a design choice, and other types of information could also be displayed in this circumstance. The XID column contains the identification for this transaction. The start SCN value for this past version is the SCN associated with the commit time for Trx3, i.e., a SCN value of 300. Since this is the version as of the present/query time, a NULL value has been placed in the "END SCN" column. It is noted that the end SCN/time may be either the current value or an indeterminate value (e.g., for a deleted version, it may be non-determined). The start time value for this past version is the timestamp associated with the commit time for Trx3, i.e., a timestamp of 4:00 PM. Since this is the version as of the present/query time, a NULL value has been placed in the "END Time" column. The Operation column identifies a "Delete" operation as having produced the version of the data items associated with row 152.

Row 154 in this example has the following values:

| 2 | 1 | Trx2 | 200 | 300 | 3:00 PM | 4:00 PM | Update |
|---|---|------|-----|-----|---------|---------|--------|

This row corresponds to the update operation that was performed by Transaction Trx2. Therefore, the XID pseudo column contains the identification of transaction Trx2. The START SCN value for this version is the SCN value associated with the commit time for Trx2, i.e., a SCN value of 200. The END SCN value for this version is the SCN value associated with the commit time for the next transaction that has produced another version of the data items, i.e., Trx3 at SCN 300. The start time value for this past version is the timestamp associated with the commit time for Trx2, i.e., a timestamp of 3:00 PM. The next transaction that modified these values is transaction Trx3 at 4:00 PM, and therefore the end time of this version is at 4:00 PM. The Operation column identifies an "Update" operation as having produced the version of the data items associated with row 154.

Row 156 in this example has the following values:

| 1 | 1 | Trx1 | 100 | 200 | 2:00 PM | 3:00 PM | Insert |
|---|---|------|-----|-----|---------|---------|--------|

This row corresponds to the insert operation that was performed by Transaction Trx1. Therefore, the XID pseudo column contains the identification of transaction Trx1. The START SCN value for this version is the SCN value associated with the commit time for Trx1, i.e., a SCN value of 100. The END SCN value for this version is the SCN value associated with the commit time for the next transaction that has produced another version of the data items, i.e., Trx2 at SCN 200. The start time value for this past version is the timestamp associated with the commit time for Trx1, i.e., a timestamp of 2:00 PM. The next transaction that modified these values is transaction Trx2 at 3:00 PM, and therefore the end time of this version is at 3:00 PM. The Operation column identifies an "Insert" operation as having produced the version of the data items associated with row 156.

In one embodiment, a view can be decorated with a VERSIONS clause. In an alternate embodiment, a view is not decorated with a VERSIONS clause, but instead, the view definition uses the VERSIONS clause.

In one embodiment, a table with VERSIONS clause in a select statement will not produce versions of the row(s) across certain DDLs. This means that the table will stop producing the version of the row(s) once it hits a time in past when the table specification was changed.

The update operation on certain tables may be translated into an insert and a delete. For example, this action may be taken for index organized tables (IOT). A query on such a table with VERSIONS clause will not retrieve the higher-level operation (i.e. update) instead it will be an delete and a insert on two separate versions of two separate rows. For example, update on the key value of an IOT and subsequent query on the IOT with

```
VERSIONS decoration with a where clause on a non key column:
SQL> UPDATE myiot SET keycol = 5 WHERE keycol = 4;
SQL> COMMIT;
SQL> SELECT keycol, nonkeycol, versions_operation "OPERATION"
FROM myiot
VERSIONS BETWEEN SCN MINVALUE AND MAXVALUE WHERE
nonkeycol = 9;
```

| KEYCOL | NONKEYCOL | OPERATION |
|--------|-----------|-----------|
| 5      | 9         | I         |
| 4      | 9         | D         |

2 rows returned

In one embodiment, time-to-SCN mapping is performed, e.g., with a 10 second granularity. In an embodiment, the row-SCN of a version ca be retrieved. Please note that a NULL value for start or, end SCN indicates that the value is either infinite or, indeterminate for the given version of the row.

The present invention can be enabled for distributed operations. The query includes "AS OF" query as well as session level flashback. This enhancement adds the temporal dimension to the distributed query and is part of overall goal of distributed interoperability. More details regarding an approach for implementing distributed interoperability is described in co-pending U.S. application Ser. No. 10/866,333, filed on Jun. 10, 2004, which is hereby incorporated by reference in its entirety.

Processes

As noted above, embodiments of the present invention allow users to specify a new table decoration clause called VERSIONS in the FROM clause of the select statement of the queries. A query on a table with VERSIONS clause produces all the versions of all the rows that exist or, ever existed between the time the query was issued and the point back in time that is the retention time of log records used to acquire past versions of a data item. The results of a query with a where clause on a table decorated with VERSIONS is as if the where clause were applied to the versions of the rows produced as described above. A query on a table decorated with VERSIONS clause will be referred to as version query. The version query will return versions of the rows across transactions only.

An example of a type of log record that can be used to retrieve a past version is an "undo" record, which contains information about how to undo the changes made to a database table. As referred to herein, "undo_retention" refers to a parameter, e.g., an auto tuned parameter, that is associated with a retention period for undo records.

A table decorated with VERSIONS clause behaves essentially like a two dimensional row source with time as an added dimension. This new row source will keep producing the rows until it either hits the lower bound scn/timestamp for the VERSIONS clause or, the undo_retention time. The invention converts a regular row source into this special row source if a table is decorated with the VERSIONS clause.

The present section describes embodiments of the processes that are employed to implement a query upon past versions. In one embodiment, the version query can be defined as either "rowid"-based access or non-rowid based access. With rowid based access, a given rowid is used to identify the data for which past versions are desired. As used herein, a rowid refers to a physical location for an item of data, e.g., a physical location comprising a block and a slot within that block. With this type of access, all versions of the specified row id will be returned irrespective of the row content. This essentially means that all versions of the slot in the block indicated by the row id will be returned. With non-rowid based access, other types of information are used to identify the data for which past versions are desired, such as identification of a key, range of keys, block or even an entire table.

Figure 7A:
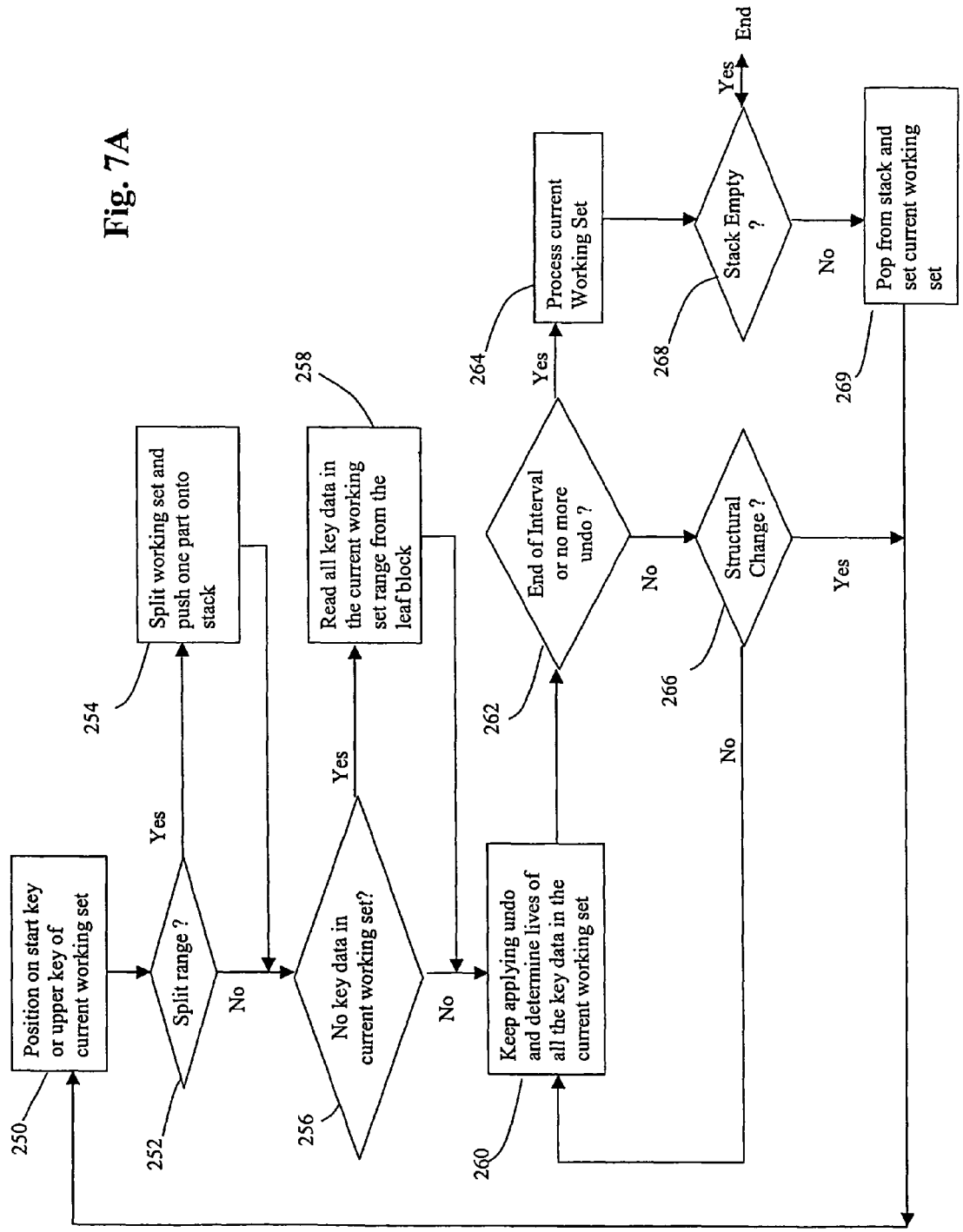
FIG. 7A shows a flowchart of a process to execute a version query based upon a range of keys according to an embodiment of the invention.
Figure 8:
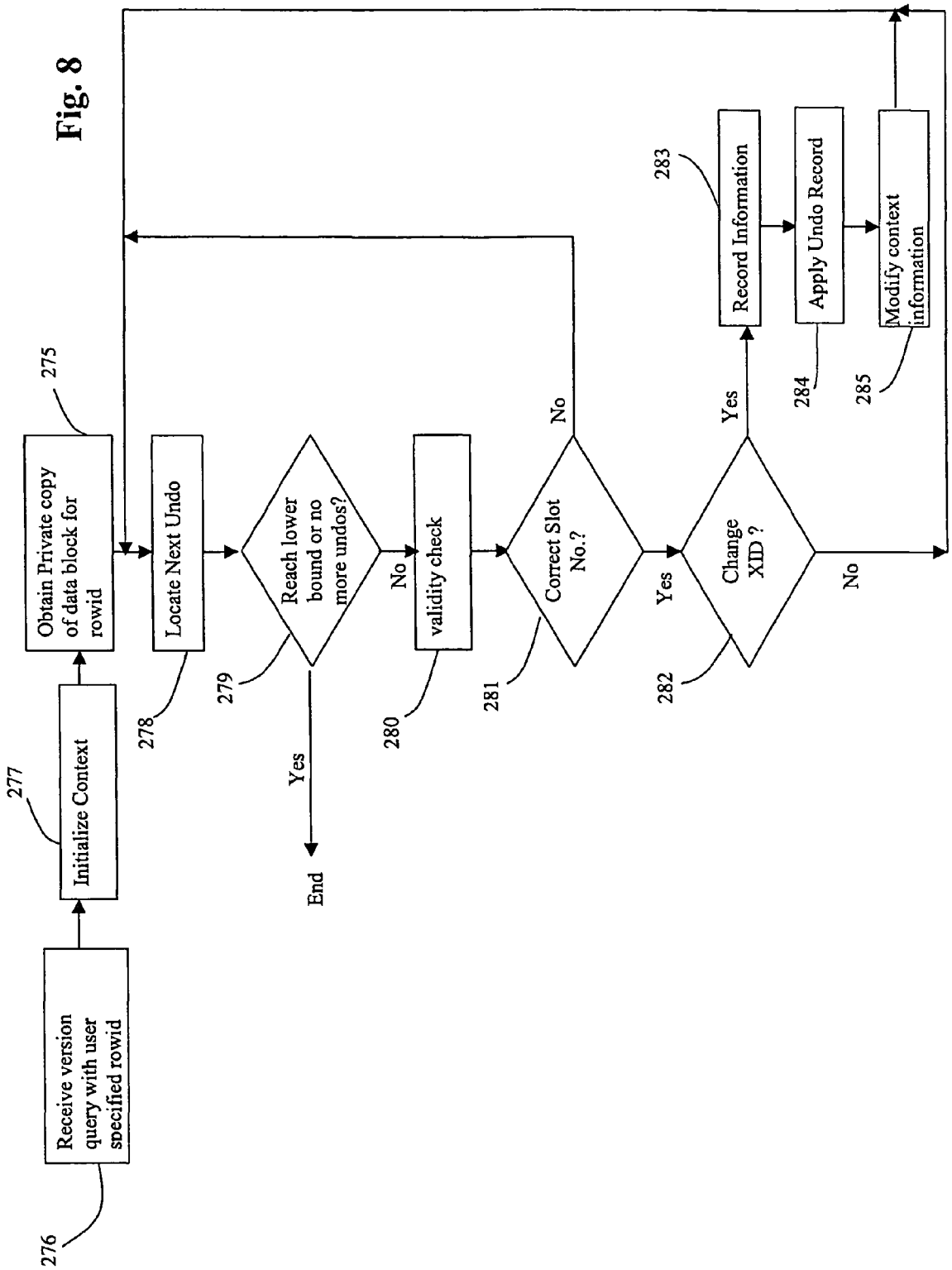
FIG. 8 shows a flowchart of a process to execute a version query based upon a user-specified ROWID according to an embodiment of the invention.
Figure 9:
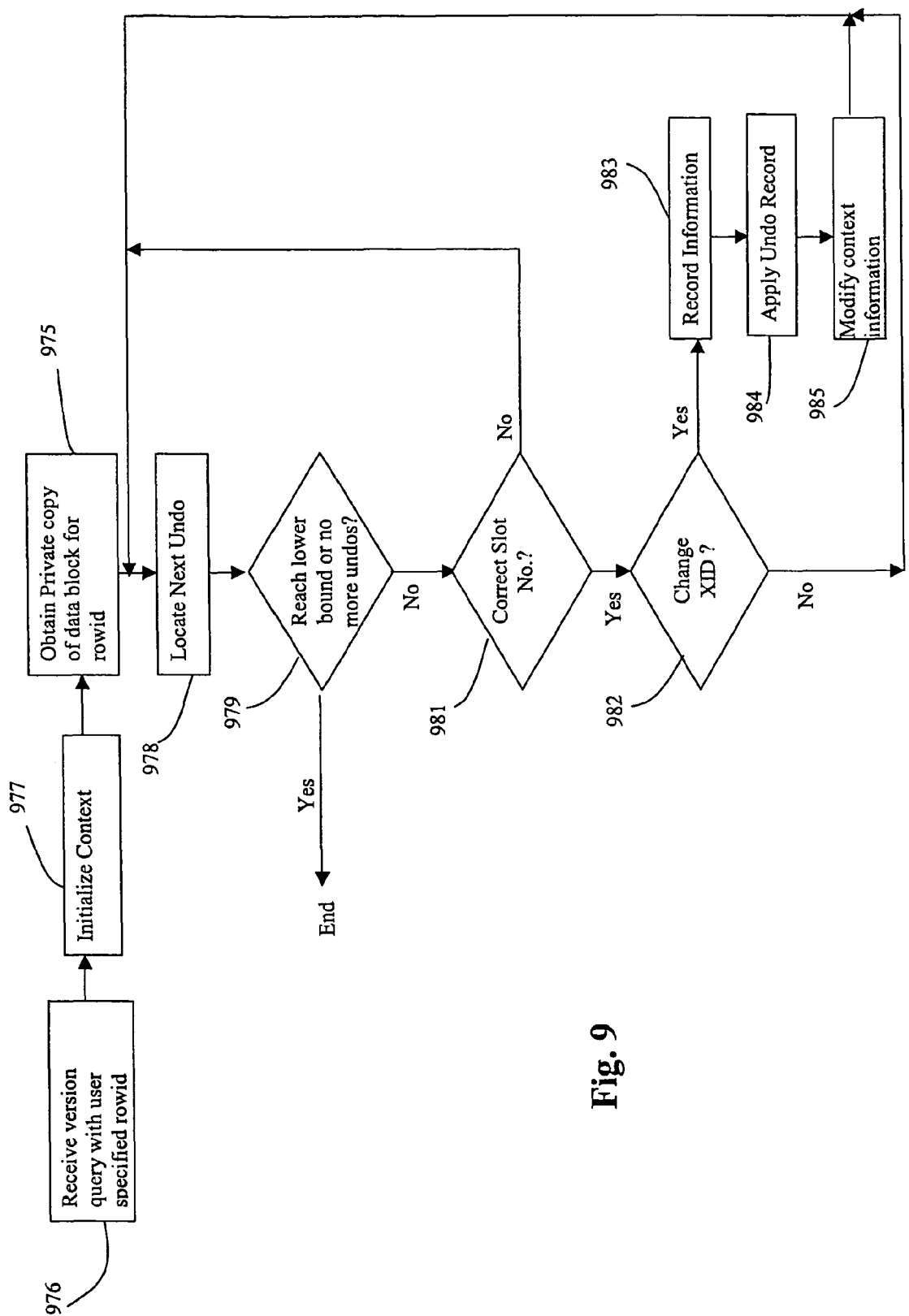
FIG. 9 shows a flowchart of a process to execute a version query based upon a index-provided ROWID according to an embodiment of the invention.
Figure 10:
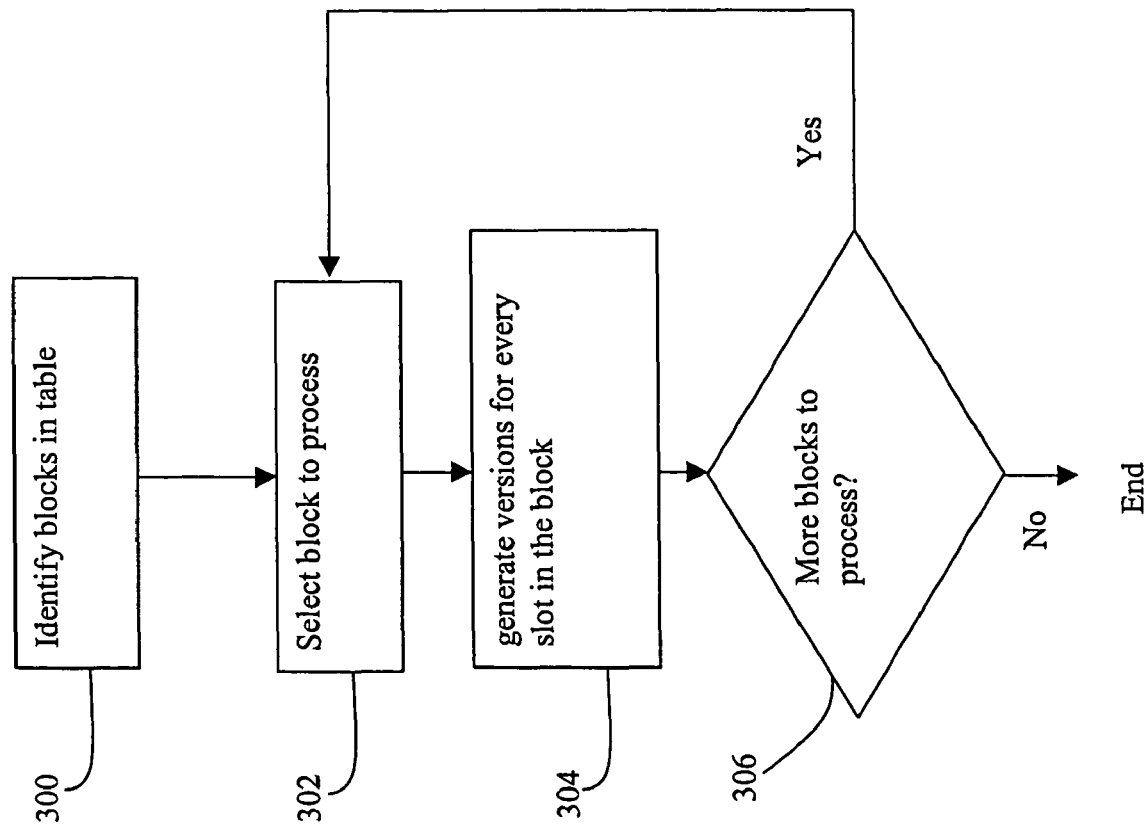
FIG. 10 shows a flowchart of a process to execute a version query based upon specifying an entire table according to an embodiment of the invention.

FIG. 5 shows a high-level process flow for accessing past versions of data item(s) according to an embodiment of the invention. At 202, a determination is made of the type of access that is being employed to access the past versions of data. As mentioned, the access could be rowid-based or non-rowid-based. Even within these two broad categories, there may be subcategories of rowid-based or non-rowid-based access to past versions of data. For example, with rowid-based access, the rowid may be provided by a user (208) or from an index (210). If the rowid is provided from a user, then the process of FIG. 8 is employed to retrieve past versions of the data item (218). If the rowid is provided from an index, then the process of FIG. 9 is employed to retrieve past versions of the data item (220). With non-rowid-based access, there may be access initiated by identification of, for example, either a key, range of keys, block or of a table. If the desired access is based upon a given key, then the process of FIG. 6 is employed to retrieve past versions of the data item (214). If the desired access is based upon a given range of keys, then the process of FIG. 7A is employed to retrieve past versions of the data item (216). If the desired access is based upon identification of a table for which past versions all rows are desired, then the process of FIG. 10 is employed to retrieve past versions of the data item (222). Thereafter, the process receives information about the past versions of the requested data item(s) (224), which are then displayed, e.g., as described with respect to FIG. 1. It is noted that this is not a limiting list of access types, and indeed, there may be other types of access which fall within the scope of the invention.

Index Data Generation

This section describes an approach for generating all incarnations of a key (e.g., described by data(rowid)) along with the validity interval of each incarnation.

When a key is given as input for a versions query, the present embodiment obtains the past versions of the data item by first determining the life(s) and rowid(s) associated with that key, and then generating past versions of the data at those rowids during the identified life intervals.

Figure 6A:
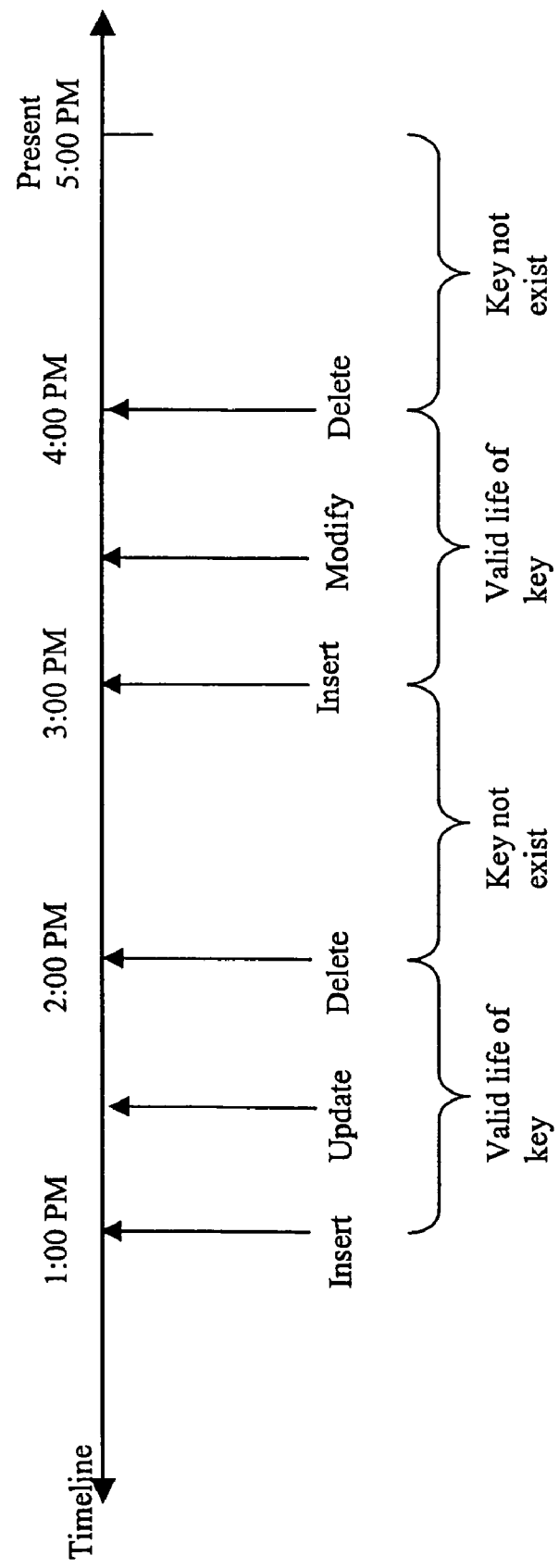
FIG. 6A shows a timeline illustrating example operations against a key.

To illustrate, consider the timeline shown in FIG. 6A. As shown, assume that a given key is inserted at 1:00 PM, some other non-key data of the same row is updated sometime thereafter, and then is deleted at 2:00 PM. Later, the same key is inserted again at 3:00 PM, again some non-key data of the same row is modified sometime thereafter, and is deleted at 4:00 PM. Based upon this timeline, the key only exists in the intervals between 1:00 PM to 2:00 PM and from 3:00 PM to 4:00 PM. The key does not exist in the interval between 2:00 PM and 3:00 PM and from 4:00 PM to 5:00 PM. Therefore, it would be a mistake to attempt to obtain the values associated with that key during these intervals in which the key does not exist. Thus, it is helpful to identify these life intervals for a key (and the rowid during these intervals) so that the versions query can appropriately only retrieve data for the data item/key when that key exists or has existed.

Figure 6B:
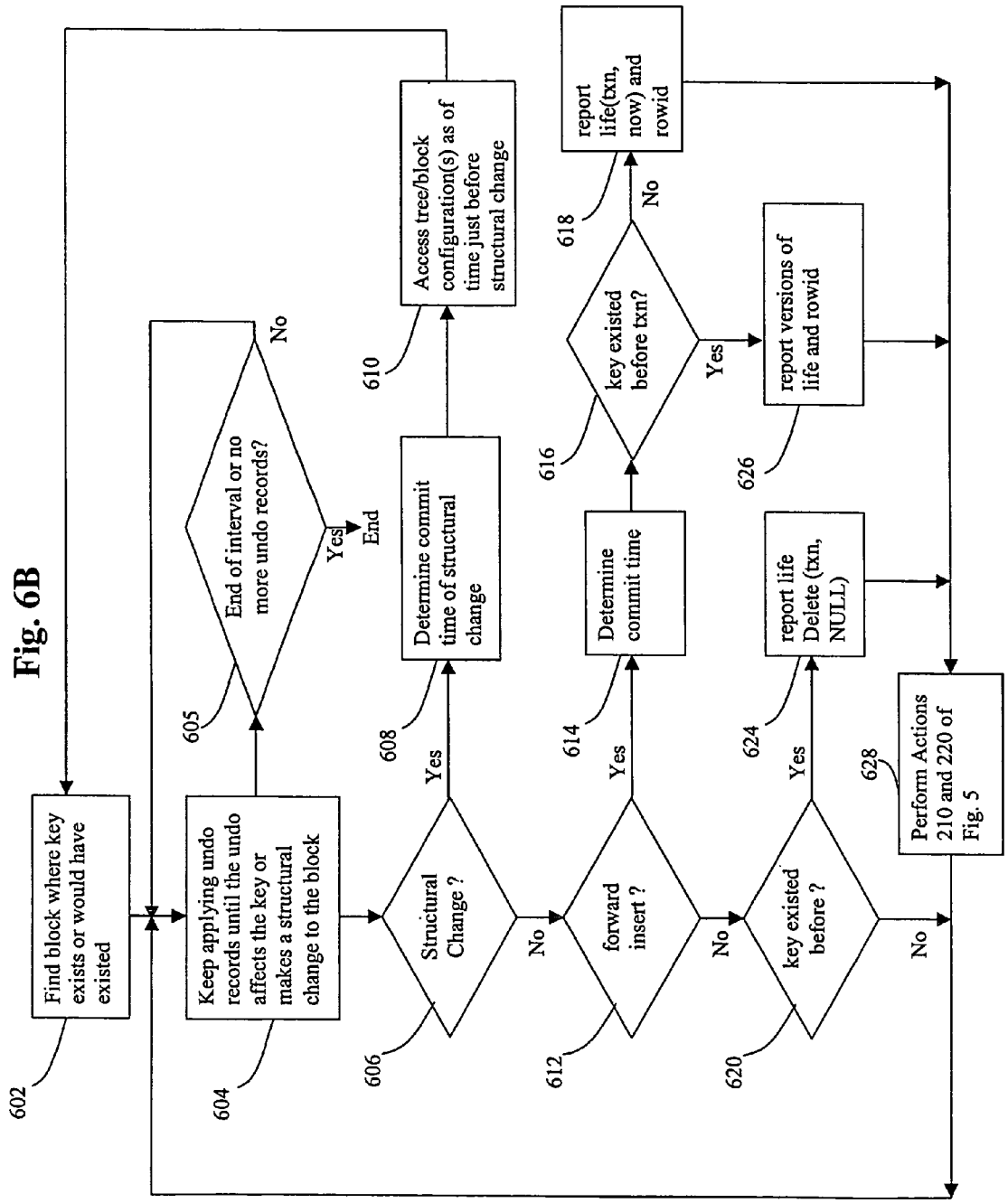
FIG. 6B shows a flowchart of a process to execute a version query based upon a specified key according to an embodiment of the invention.

FIG. 6B is a flowchart of a process for generating past incarnations according to an embodiment of the invention when a key value is provided. The present process assumes that the key of interest is a primary key. If the key of interest is not a primary key, then the range scan approach of FIG. 7A is employed to perform the process.

In general, the process of FIG. 6B is performed by rolling back the index leaf block where the key exists or, would have existed. Therefore, the process begins by walking the index to identify the specific block that should correspond to the key of interest. Since the index is normally an ordered set, the process merely needs to determine where the appropriate block is, or should be, for the identified key in the ordered index.

A context is maintained during the processing of the present method. In one embodiment, the context contains a transaction identifier and a SCN value related to events of interest that are identified for past versions of the data item. At the beginning of the process, the context is initialized such that no specific transaction ID or SCN is identified in the context.

The process is performed by positioning upon the identified block and applying undo records in reverse temporal order until specific events of interest from the past are recognized. In effect, the block is rolled backwards in time for the time/scn interval of interest, and during this interval, information about all transactions that affect the data item is recorded. The different states of the data item during that interval and information about the list of transactions that cause these changes in state during the interval provide the information that is presented. As explained in further detail below, the information about rowid versions from an index are used to generate row versions to be presented to the user.

During the process, the context is updated with a context SCN or context timestamp from which an end interval for a life of the key has been identified. For example, with respect to FIG. 6A, assume that a transaction TX1 had inserted the key of interest at 3:00 PM, a second transaction TX2 deleted the key of interest at 4:00 PM. When moving backwards in time, the process identifies an undo records associated with interesting transactions, that is, a transaction associated with the key of interest. Here, applying undo records in reverse-commit order, identification can be made that transaction TX2 has deleted the key. The timestamp and/or SCN for TX2 is recorded as the context SCN/timestamp. The identity of transaction TX2 is also recorded in the context. As undo records are applied, they are checked to see if they are related to the key of interest, and if so, then whether they relate to the same or different transaction. If they are associated with the same transaction, then they do not change the context entries since they are probably intermediate changes made by the same transaction. If they are associated with a different transaction, then it is likely that a committed change has occurred. If so, then the context SCN/timestamp and transaction changes based upon the information in the undo record, e.g., in FIG. 6A, assuming no intermediate changes by other transactions, the context SCN/timestamp would change to 3:00 PM and the identifier for transaction TX1 would be recorded.

The process of FIG. 6B begins by identifying the block at which the key exists or would have existed in the past (602). In a sorted index, such as a B+tree index, this action is performed by identifying the specific leaf block which contains the range associated with the key.

At action (604), undo records are applied to the block in reverse-commit order to restore past versions of the block. An undo record is a record containing information about how to undo a change made to the database. In some database systems, any change made to the database results in the creation of a corresponding undo record that describes how to undo that change. More information about an exemplary approach for implementing, identifying, and applying undo records is described in co-pending U.S. application Ser. Nos. 10/364,209 and 10/364,065, filed on Feb. 10, 2003, which are hereby incorporated by reference in their entirety. In the present embodiment, the actions are applied to a copy of the block to create a past version, and the undo records are not applied to the actual working block itself.

The undo records are applied until an undo record is identified which corresponds to an event of interest (604). Examples of events of interest include (a) a structural change to the block; or (b) a change occurs affecting the key. Undo records are applied to attempt to find these events of interest until the low point of the specified time range has been reached, or until there exists no further undo records to apply (605). If the lower bound of the interval is reached or no further undo records exist to apply, then the process ends. Otherwise, the process continues applying action (604) until an event of interest is identified.

As noted, the process may need to identify whether a structural change has occurred to the block. Examples of such structural changes include block splits in which a single block has split into two blocks and block coalesce in which multiple blocks merge into a single block. The process should be robust enough to address such structural changes to a block.

Therefore, at process action (606) a determination is made whether a structural change has occurred to the block. If a structural change has occurred, then a determination is made regarding the commit time of the structural change (608). At this point, the process accesses/repositions to the data as of the time just prior to the commit of the structural change (610). One approach to implement process action (610) is by applying undo on the portion of the tree that corresponds to the block of interest. This approach recreates the relevant portion of the index tree as of the correct point in time. The techniques used to implement consistent-read in a database system can be applied to restore the tree as of a particular point in time.

The process then proceeds back to action (602) to re-walk the tree as of that point in time to locate the appropriate block at which the data exists or would have existed. The process again proceeds with the application of undo records against the block (604).

If the undo record is not related to a structural change (606), then it is a database operation that has affected the key. With an index block, the most common operations that are applied are "insert" and "delete". To facilitate an explanation of the invention, the process only addresses insert and delete operations. However, it is noted that the principles of the present process can be expanded to apply to any type of index operations, e.g., against an index only table (IOT).

A determination is made whether the undo record relates to a forward insert operations (612). If so, then the process determines the commit time of the transaction that performed the insert operation (614). There are multiple possibilities in this scenario. One possibility is that the key existed before the transaction, in which the transaction had earlier deleted the key and has now inserted it. Another possibility is that key did not exist before the present transaction inserted it. A determination is made of either possibility at process action (616). One approach for making this determination is to perform a search for the key at the time before the identified transaction. Whether the key exists before the transaction will allow the process to determine which possibility is applicable.

If the key did not exist before the present transaction, then the life of the key is the time from the transaction commit time until the context scn/time. In an embodiment, null means the current time or a subsequent transaction commit. Based upon this life period and the appropriate rowid from the block for the data of interest, the past versions would then be acquired over this period of time by applying process actions 210 and 220 of FIG. 5, which are described in more detail below in conjunction with the explanation of FIG. 9. Versions of the data for the rowid are thus generated from the table data over the specified time interval.

If the key existed before the present transaction, then the life of the key may be based upon three periods/versions over time. One version is for the present insert, and corresponds to the period from the transaction commit time to the context scn/time. Another version is for a delete, and corresponds to a period from the transaction commit time to NULL. A third version is based upon an operation that has occurred in the past prior to the present undo. The information for the third version is acquired after more undo records are applied. These versions identify the life of the key, which is then used along with the appropriate rowid values from the block to retrieve past versions of the data by applying process actions 210 and 220 of FIG. 5. In an embodiment, the actions of 210 and 220 are executed three different time, once for each period/version as noted above. Versions of the data for the rowid are generated from the table data over the specified time interval.

Referring back to process action (612), if the undo record does not relate to a forward insert operation, then it is presumed that the undo record pertains to a delete operation. A determination is made whether the key existed prior to the present delete operation (620). It could be that the key was deleted (and previously inserted) within the course of a single transaction, and therefore was never visible outside of the transaction. One way to make this determination is to search for the key at a time just before the commit time of the transaction related to the present undo record.

If the key did not exist before, then it was never visible outside of the transaction, and therefore the undo record does not really pertain to an interesting event. Therefore, the process returns back to action 604 to continue applying undo records.

If, however, the key did exist before, then there is a life span for the key that should be examined for past versions of the associated data. The life of the key would be reported from the time of the present transaction to NULL. The information for another version is acquired after more undo records are applied. These versions identify the life of the key, which is then used along with the appropriate rowid values from the block to retrieve past versions of the data by applying process actions 210 and 220 of FIG. 5, which are described in more detail below in conjunction with the explanation of FIG. 9. Versions of the data for the rowid are thus generated from the table data over the specified time interval.

The ability to generate the life intervals for a key has wide application, even beyond its use for a versions query. For example, consider if it is desired to audit data or to generate an audit trail for data based upon knowledge of the key associated with that data. Tracking the life intervals for that key, e.g., as described with respect to the process of FIG. 6B, is an important step in auditing actions made against the data associate with the key.

Key_Range_Version

This section describes an approach for generating all incarnations of the key data along with the validity interval for the keys that existed in the specified key range during the specified time interval.

As noted above, when a key is given as input for a versions query, the present embodiment obtains the past versions of the data item by first determining the life(s) and rowid(s) associated with that key, and then generating past versions of the data at those rowids during the identified life intervals. When a range of keys is given, this process of determining the life(s) and rowid(s) is performed for each key in the range.

FIG. 7A is a flowchart of a process for generating past incarnations according to an embodiment of the invention. It is assumed that a range of keys has been specified to the process. For every key that has ever existed in the specified range over the time interval of the query, the process will identify the life of those keys and obtain past versions of the corresponding data. The process begins by positioning on the start key for the range of keys (for the initial iteration through the process loop) or the upper key of current working set (for each subsequent iteration of the process loop) (250).

At 252, a determination is made whether to split the range into two ranges. Generally, if the entire key range is located on a single block, then the range does not yet need to be split (although it may need to be split later, e.g., if undo records are applied it is determined that a coalesce has occurred in the past). If, however, the range is located on multiple blocks, then the range is split into two ranges.

One approach to determining whether to split a range is to examine the range of keys for the block associated with the start key as well as the first key in the very next block. Please note that if the block associated with the start key is the last block, then there is no next block. If the separator between the two blocks is less than the end key of the current working set/range, then a split will occur.

Figure 7B:
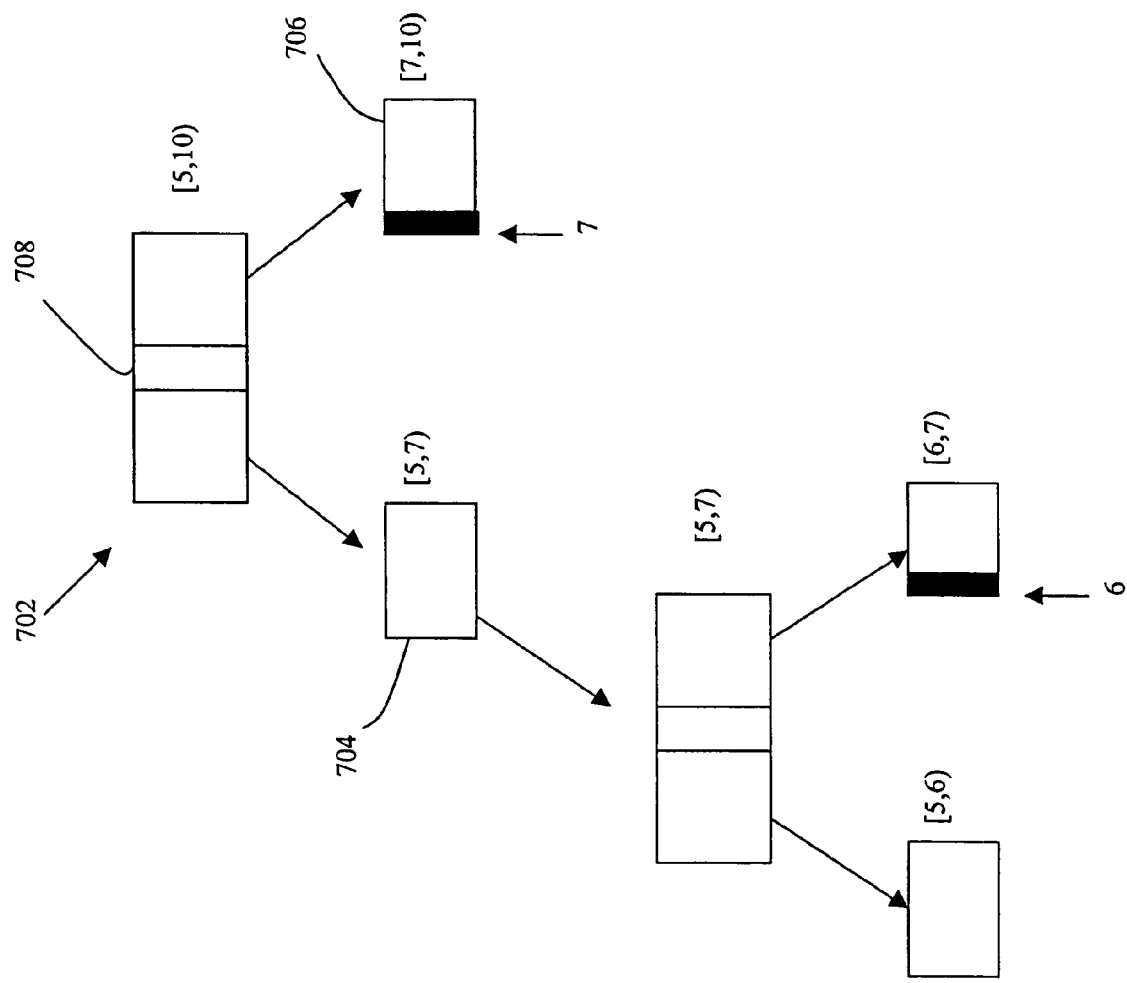
FIG. 7B shows an illustrative example of a process to execute a version query based upon a range of keys according to an embodiment of the invention.

To illustrate, consider the configuration shown in FIG. 7B. Assume that a query is issued for a key range that is between 5 and 10. Further assume that a branch 702 points to both a first leaf block 704 and a second leaf block 706. The branch 702 includes a separator 708 which indicates the boundary between the key ranges within block 704 and block 706. The values of the keys in the range associated with the first block 704 is less than the value of the separator 708. The vales of the keys in the range associated with the second block 706 is equal to or greater than the value of the separator 708.

The process therefore can determine the range of keys associated with first block 704, which is the range from the start key until the last key in the first block 704 (i.e., [5,7)). The process can derive the first key in the next block by identifying the next block (i.e., block 706), based upon the separator, and acquiring the first key in the next block (i.e., first key=7).

If the end key of the range for the current processing (i.e., 10>range >5) is larger than the separator key, then a split will occur for the range (254). When this happens, then in one embodiment, the rightmost range (i.e., the range [7, 10) encompassing the larger key values) is placed onto a stack, and the process repositions the working range as the first range, i.e., range [5, 7). The range [5, 7) may be further split by placing range [6, 7) onto the stack and setting range [5, 6) as the current working range.

A determination is now made whether there are any key data in the current working set (256). The first time through a range for a working set, there may not yet be any key data that has been accumulated. If there is not yet any key data, then the process reads in key data in the current working set range from the appropriate leaf block (258).

Undo records are applied, and the life(s) and rowid values are determined for all key data in the current working set (260). While applying the undo records, the process determines whether the lower bound of the specified interval has been reached, or if there are no further undo records to apply (262). If the lower bound of the interval is reached or no further undo records exist to apply, then the current working set is processed (264).

A determination is then made whether the stack contains any further working sets/ranges to process (268). If the stack is empty, then the process ends. Otherwise, a working set/range is popped from the stack and set as the new current working set (269). For example, if range [5, 6) of FIG. 7B has completed processing (i.e., life and rowid values(s) have been generated for each key in this range), then range [6, 7) is popped off the stack and processed. It is noted that further splits at (252) may occur when processing this popped range. The process then returns back to action 250 to reposition on the upper key of the current working set and continues processing as described above.

If, at (262), it is determined that the lower bound of the specified interval has not been reached and there are further undo records to apply, then a determination is further made whether a structural change has occurred and been detected, e.g., a block coalesce (266). If a structural change has not occurred, then the process returns back to action 260 to continue applying undo records.

If a structural change has been detected, then the process repositions as of the time just before the structural change and continues the process from (250).

The action to process the working set is performed, for example, by reporting life and rowid value(s) for each key within the working range.

It is noted that as each block is being processed by applying undo records, the data collected for each block is stored, even after a split occurs. Therefore, when the range [6, 7) is popped off the stack, some data for this range already exists based upon the prior processing for range [5, 7). In one embodiment, if excessive memory/resource usage is detected or sought to be addressed, then the prior data need not be stored. Instead, the range can be fully processed without data from previous processing.

As noted above, the ability to generate the life intervals for a key or range of keys has wide application, even beyond its use for a versions query. Here, the process to identify the life intervals for a range of keys, e.g., as described with respect to the process of FIG. 7A, can be applied to perform auditing or to generate an audit trail for data based upon knowledge of the keys or range of keys associated with data to be audited.

Rowid_Version from User

This section describes an approach for generating the versions of a particular rowid in a given interval. In one embodiment, a rowid corresponds to the combination of a particular block id and slot id. A "user rowid" is a rowid value that is specified by a user. In some database systems, interfaces/calls are available for users to specifically identify the rowid/physical location of data items in the system. This section describes a process for allowing a user to retrieve past versions of data within the slot in a given block that corresponds to the rowid value. It is noted that since the rowid is the physical address, the value within that location may or may not consistently correspond with any particular logical data values (in contrast to, for example, key values).

FIG. 8 is a flowchart of a process for generating the versions of a particular rowid in a given interval. This interval, e.g., SCN interval, may be closed at both the ends. The process begins when a version query is received which is predicated upon a user-specified rowid value (276). The following provides an example format for such a version query:

```
SELECT *
FROM table_a_b
VERSIONS BETWEEN TIMESTAMP TO_TIMESTAMP (2:30 PM)
    AND TO_TIMESTAMP (3:30 PM);
WHERE rowid = 'row id_abcdef';
```

This query seeks the past versions of the data from table 'table_a_b' for the interval 2:30 PM to 3:30 PM for the rowid having the address 'row_id_abcdef'.

In general, the process functions by obtaining a private copy of the block and starts rolling it back in reverse commit order. Since the rowid has been provided, the process can immediately identify the block that is of interest. A context is maintained during the processing of the present method. In one embodiment, the context contains a transaction identifier and a SCN value related to events of interest that are identified for past versions of the data at the rowid. At the beginning of the process, the context is initialized such that no specific transaction ID or SCN is identified in the context (277).

At 275, a private copy of the data block for the given rowid is obtained. Prior to obtaining the private copy, the value of the rowid is checked to make sure that it is a valid physical address for the desired data.

The rest of the process is performed by positioning upon the private copy of the identified block and applying undo records in reverse temporal order until specific events of interest from the past are recognized for the slot corresponding to the rowid. In effect, the block is rolled backwards for the for the time/scn interval of interest, and during this interval, information about all transactions that affect the slot is recorded. The different states of the data item during that interval and information about the list of transactions that cause these changes in state during the interval provide the information that is presented to the user.

At 278, an undo record is selected to be applied to the block. As previously stated, an undo record is a record containing information about how to undo a change made to the database. At 279, an examination is made of the undo record that has been selected if it was available. Before applying the undo record, the process determine whether the undo record corresponds to a change that exceeds the lower bound of the specified time/scn interval.

Before applying interesting undo records the process checks for various conditions affecting the rowid. For instance, consider an undo record relating to an update operation. Two possible scenarios that may occur include a first scenario in which the row existed before the update transaction, or a second scenario in which the row did not exist before and the present transaction inserted the data and performed an update during the same transaction. For a forward insert, similar possibilities could be present in which the row either did or did not exist before the present transaction. For a forward delete, the row again may or may not have existed before the present transaction. It is even possible that the row does not exists at all. Therefore, the particular time portions of the specified interval to obtain past versions could be affected by these types of validity checks, which could remove certain time sub-intervals depending upon the existence of the row during those sub-intervals.

A determination is made whether the undo record corresponds to the slot of interest (281). If not, then the process returns back to 278 to select another undo record to be applied. If the undo record does not pertain to the slot of interest, then it will not contain useful information about a past version of that slot, and the process can therefore not apply this undo record.

Even if the undo record relates to a slot of interest, a determination is made whether the undo record corresponds to a transaction that is different from the transaction ID stored in the process context (282). Every time a change of state is identified as the undo records are applied, the ID of the transaction responsible for the changed state is recorded in the process context. As each new undo record is selected for processing, the transaction ID stored in the process context is compared against the ID of the transaction associated with the undo record. If the two ID values are the same, this means that the change noted in the undo record is an intermediate change (e.g., uncommitted changes), and therefore, not of interest to this process.

However, if the transaction ID value in the process context and the transaction ID value associated with the undo record are not identical, this means that the process has identified a new version of the data item, e.g., an action that has resulted in a committed change for the data item. In this case, the transaction ID and SCN value associated with the undo record is recorded (283). The undo record is applied to the block to reverse the change associated with the undo record (284). The information about the undo record can then be copied to the process context (285). In one embodiment, actions 283 and 285 are performed before application of the undo record (284), so that data to be recorded is not lost by applying the undo until it has been adequately noted. Over the specified time/scn interval, a list of such past versions and their associated transaction information will be recorded.

The process returns back to action 278 to select another undo record, and this process continues until it is appropriate to stop (279).

In some circumstances, it is desirable to apply undo records beyond the lower bounds of the time/scn interval. For example, consider if the rowid contains data at a given state at the time of the lower bound of the interval, but the identity of the transaction that produced that state cannot be determined unless the process goes farther back in time beyond the lower bound of the interval. In this circumstance, it may be desirable to exceed the lower bound of the interval to obtain this information.

Rowid_Version from Index

An alternate vehicle for obtaining a rowid is from accessing an index, e.g., rowid values obtained from the processes of FIG. 6B or 7A. FIG. 9 shows a flowchart of a process to obtain past versions based upon a rowid specified from an index. This process is similar to the process of FIG. 8 described in the previous section, with the primary exception that it is assumed the valid life(s) of the rowids have already been determined, e.g., as described with respect to FIGS. 6B and 7A. Therefore, a separate action for a validity check of the rowid value (280) is not performed.

As noted, this section describes an approach for generating the versions of a particular rowid in a given interval with the rowid values provided from an index. In one embodiment, a rowid corresponds to the combination of a particular block id and slot id.

FIG. 9 is a flowchart of an embodiment of a process for generating the versions of a particular rowid in a given interval when the rowid is provided by an index. The process begins when a version query is received which is predicated upon a specified rowid value (976).

In general, the process functions by obtaining a private copy of the block and starts rolling it back in reverse commit order. Since the rowid has been provided, the process can immediately identify the block that is of interest. A context is maintained during the processing of the present method. In one embodiment, the context contains a transaction identifier and a SCN value related to events of interest that are identified for past versions of the data at the rowid. At the beginning of the process, the context is initialized such that no specific transaction ID or SCN is identified in the context (977).

At 975, a private copy of the data block for the given rowid is obtained. The process is performed by positioning upon the private copy of the identified block and applying undo records in reverse temporal order until specific events of interest from the past are recognized for the slot corresponding to the rowid. In effect, the block is rolled backwards for the for the time/scn interval of interest, and during this interval, information about all transactions that affect the slot is recorded. The different states of the data item during that interval and information about the list of transactions that cause these changes in state during the interval provide the information that is presented to the user.

At 978, an undo record is selected to be applied to the block. As previously stated, an undo record is a record containing information about how to undo a change made to the database. At 979, an examination is made of the undo record that has been selected. Before applying the undo record, the process determine whether the undo record corresponds to a change that exceeds the lower bound of the specified time/scn interval.

A determination is made whether the undo record corresponds to the slot of interest (981). If not, then the process returns back to 978 to select another undo record to be applied. If the undo record does not pertain to the slot of interest, then it will not contain useful information about a past version of that slot, and the process can therefore not apply this undo record.

Even if the undo record relates to a slot of interest, a determination is made whether the undo record corresponds to a transaction that is different from the transaction ID stored in the process context (982). Every time a change of state is identified as the undo records are applied, the ID of the transaction responsible for the changed state is recorded in the process context. As each new undo record is selected for processing, the transaction ID stored in the process context is compared against the ID of the transaction associated with the undo record. If the two ID values are the same, this means that the change noted in the undo record is an intermediate change (e.g., uncommitted changes), and therefore, not of interest to this process.

However, if the transaction ID value in the process context and the transaction ID value associated with the undo record are not identical, this means that the process has identified a new version of the data item, e.g., an action that has resulted in a committed change for the data item. In this case, the transaction ID and SCN value associated with the undo record is recorded (983). The undo record is applied to the block to reverse the change associated with the undo record (984). The information about the undo record can then be copied to the process context (985). In one embodiment, actions 283 and 285 are performed before application of the undo record (984), so that data to be recorded is not lost by applying the undo until it has been adequately noted. Over the specified time/scn interval, a list of such past versions and their associated transaction information will be recorded.

The process returns back to action 978 to select another undo record, and this process continues until it is appropriate to stop (979).

In some circumstances, it is desirable to apply undo records beyond the lower bounds of the time/scn interval. For example, consider if the rowid contains data at a given state at the time of the lower bound of the interval, but the identity of the transaction that produced that state cannot be determined unless the process goes farther back in time beyond the lower bound of the interval. In this circumstance, it may be desirable to exceed the lower bound of the interval to obtain this information.

Data_Block_Version

This section describes a process for generating all the versions of all rows over a time interval for an entire table. One approach to implementing this process is to identify all blocks associated with the table, and for each block, generate versions of all the slots that exist or, ever existed in the specified time interval on the data blocks.

FIG. 10 is a flowchart of a process for generating all the versions of all rows over a time interval for an entire table. The present approach therefore scans a whole table to identify the past versions. At 300, the blocks associated with the table are identified. The process will proceed block by block over the specified interval to retrieve the information about past versions for the table.

At 302, a block is selected for processing. A context is maintained during the processing of the present method. In one embodiment, the context contains a transaction identifier and a SCN value related to events of interest that are identified for past versions of the data at the slots in the block. One context per possible slot is initialized. In addition, the interval information is kept in structures of the row version data access context structure. At the beginning of the process, the context is initialized such that no specific transaction ID or SCN is identified in the context. In an embodiment, a separate context is maintained for every slot in the block under examination.

The process applies undo records for each block in reverse temporal order to retrieve past versions of data on the block (304). The approach of action 304 is quite similar to the process of FIG. 8, with the exception that unlike the process of FIG. 8 in which only specific slots were of interest (i.e., the slot associated with the rowid), in the present process every slot in the block is potentially of interest. The process computes the maximum number of slots contained within the block. As the block is moved back in time, the process keeps track of the slots that is identified.

As the undo records are applied, a determination is made whether the undo record corresponds to a transaction that is different from the transaction ID stored in the process context for a particular slot. Every time a change of state is identified as the undo records are applied, the ID of the transaction responsible for the changed state is recorded in the process context for its associated slot. As each new undo record is selected for processing, the transaction ID stored in the process slot context is compared against the ID of the transaction associated with the undo record for the appropriate slot. If the two ID values are the same, this means that the change noted in the undo record is an intermediate change (i.e., uncommitted changes), and therefore, not of interest to this process. However, if the transaction ID value in the process slot context and the transaction ID value associated with the undo record are not identical, this means that the process has identified a new version of the data item, e.g., an action that has resulted in a committed change for the data item.

Therefore, the process is performed by positioning upon the identified block and applying undo records in reverse temporal order until specific events of interest from the past are recognized for all the slots of the block. In effect, the block is rolled backwards in time for the time/scn interval of interest, and during this interval, information about all transactions that affect the slots are recorded. The different states of the data item during that interval and information about the list of transactions that cause these changes in state during the interval provide the information that is presented to the user.

For each block, an examination is made of the undo record that has been selected. Before applying the undo record, the process determine whether the undo record corresponds to a change that exceeds the lower bound of the specified time/scn interval. If so, then the process ends for the block.

A determination is made whether there are any other block to process for the table (306). If so, the process returns back to action 302 to process another block. Otherwise, if no further blocks remain to be processed, then the process ends.

System Architecture Overview

Figure 11:
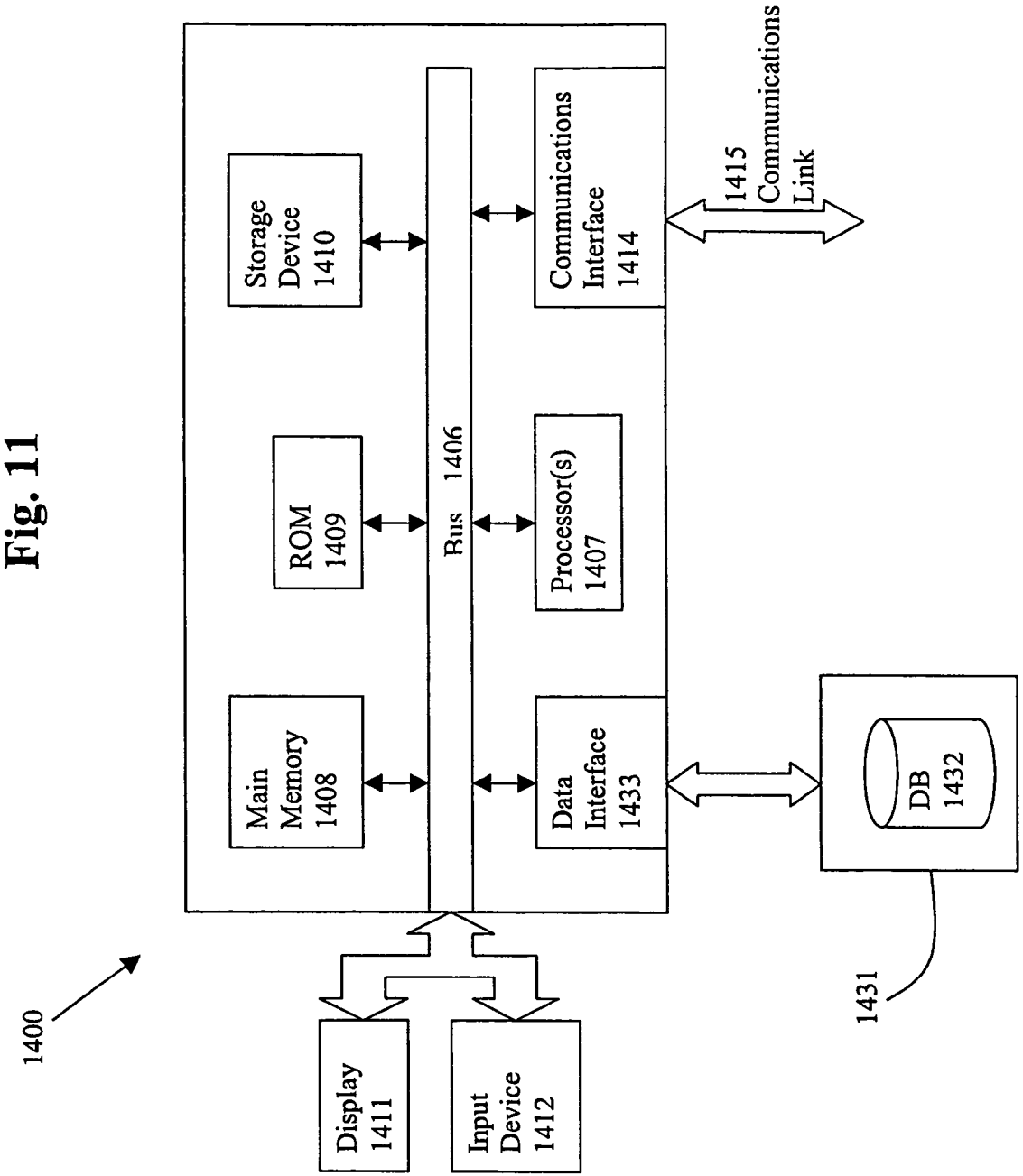
FIG. 11 is a diagram of a computer system with which the present invention can be implemented.

The execution of the sequences of instructions required to practice the invention may be performed in embodiments of the invention by a computer system 1400 as shown in FIG. 11. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 11, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software. As used herein, the term "logic" may refer to hardware, software, or any combination of hardware and software.

The term "computer-usable medium," as used herein, refers to any medium that provides information or is usable by the processor(s) 1407. Such a medium may take many forms, including, but not limited to non-volatile and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for displaying past versions of a data item in a database table, comprising:
   using a computing system that comprises at least one processor and is configured or programmed for performing a process comprising:
   receiving a request on the database table of a database system for one or more past versions of a data item over an interval, wherein
      the request comprises a specification of the interval,
      the database system comprises the database table and a log record which comprises an undo log record for the database system that is stored separately from the database table and is used to reverse one or more changes made to the database table, and
      the database table comprises the data item;
   applying a portion of the log record to the database table to create one or more prior-version database tables for the database table that comprise the one or more past versions, wherein
      each of the database table and the one or more prior-version database tables comprises a single version of the data item
   retrieving the one or more past versions of the data item over the interval by querying against the one or more prior-version database tables that were created by applying the portion of the log record to the database table to identify the one or more past versions over the interval from the one or more prior-version database tables; and
   presenting information about the one or more past versions over the interval.

2. The method of claim 1 in which the database decoration clause of the request identifies either logical time or temporal time for the interval.

3. The method of claim 2 in which the logical time relates to a SCN-based interval.

4. The method of claim 2 in which the temporal time relates to a timestamp-based interval.

5. The method of claim 1 in which the information comprises the one or more past versions.

6. The method of claim 1 in which the information comprises start time/SCN values, end time/SCN values, transaction identifier for the transaction that produces the version, or operation that resulted in the version.

7. The method of claim 1 in which the interval comprises an open interval.

8. The method of claim 1 in which the interval comprises a closed interval.

9. The method of claim 1 in which the interval has a minimum and a maximum interval value.

10. The method of claim 9 in which a default minimum interval value comprises a time when no undo records are available.

11. The method of claim 9 in which a default maximum interval value comprises a present time at which the request is executed.

12. The method of claim 1 in which the request is executed as of a particular point in time.

13. The method of claim 1 in which the request comprises a SQL query having the following syntax:
   VERSIONS BETWEEN {SCN|TIMESTAMP} MINVALUE AND MAXVALUE.

14. The method of claim 1 in which the request comprises a SQL query having the following syntax:
   [VERSIONS BETWEEN {SCN|TIMESTAMP} expr AND expr] AS OF {SCN|TIMESTAMP} expr.

15. The method of claim 1 in which a view is decorated based upon the information about the past versions.

16. The method of claim 1 in which a view definition uses the information about the past versions.

17. The method of claim 1 in which the request is a SQL statement.

18. The method of claim 1 in which the information about the past versions is not produced across changes in table specifications.

19. The method of claim 1 in which an update operations is translated as an insert and a delete operation.

20. The method of claim 19 in which the request is operated upon an index organized table (IOT).

21. The method of claim 1, in which the interval may extend beyond a time period for which one or more log records are maintained.

22. The method of claim 1, in which the database decoration clause enables a user to decorate a table of a query statement to retrieve one or more past versions of the data item within the interval.

23. The computer implemented method of claim 1, further comprising:
   applying a table decoration clause to the database table to facilitate the act of retrieving the one or more past versions of the data item over the interval, wherein
      the table decoration clause causes to identify all versions of the data item that exist or ever existed within the interval.

24. A computer program product comprising a tangible computer usable medium having executable code to execute a process for displaying past versions of a data item in a database table, the process comprising the steps of:
   receiving a request on the database table of a database system for one or more past versions of a data item over an interval, wherein
      the request comprises a specification of the interval,
      the database system comprises the database table and a log record which comprises an undo log record for the database system that is stored separately from the database table and is used to reverse one or more changes made to the database table, and
      the database table comprises the data item;
   applying a portion of the log record to the database table to create one or more prior-version database tables for the database table that comprise the one or more past versions, wherein
      each of the database table and the one or more the prior-version database tables comprises a single version of the data item;
   retrieving the one or more past versions of the data item over the interval by querying against the one or more prior-version database tables that were created by applying the portion of the log record to the database table to identify the one or more past versions over the interval from the one or more prior-version database tables; and
   presenting information about the one or more past versions over the interval.

25. The computer program product of claim 24, in which the request of the process comprises a SQL query defining the following syntax:
   VERSIONS BETWEEN {SCN|TIMESTAMP} MINVALUE AND MAXVALUE.

26. The computer program product of claim 24, in which the request of the process comprises a SQL query defining the following syntax:

[VERSIONS BETWEEN {SCN|TIMESTAMP} expr AND expr] AS OF {SCN|TIMESTAMP} expr.

27. A system for displaying past versions of a data item in a database table, comprising:
a computing system that comprises at least one processor and is configured or programmed for performing a process comprising:
receiving a request on the database table of a database system for one or more past versions of a data item over an interval, wherein
the request comprises a specification of the interval,
the database system comprises the database table and a log record which comprises an undo log record for the database system that is stored separately from the database table and is used to reverse one or more changes made to the database table, and
the database table comprises the data item;
applying a portion of the log record to the database table to create one or more prior-version database tables for the database table that comprise the one or more past versions, wherein
each of the database table and the one or more prior-version database tables comprises a single version of the data item;
retrieving the one or more past versions of the data item over the interval by querying against the one or more prior-version database tables that were created by applying the portion of the log record to the database table to identify the one or more past versions over the interval from the one or more prior-version database tables; and
presenting information about the one or more past versions over the interval.

28. The system of claim 27, in which the request comprises a SQL query having the following syntax:
VERSIONS BETWEEN {SCN|TIMESTAMP} MINVALUE AND MAXVALUE.

29. The system of claim 27, in which the request comprises a SQL query having the following syntax:
[VERSIONS BETWEEN {SCN|TIMESTAMP} expr AND expr] AS OF {SCN|TIMESTAMP} expr.

* * * * *

UNITED STATES PATENT AND TRADEMARK OFFICE
CERTIFICATE OF CORRECTION

| | | |
|---|---|---|
| PATENT NO. | : 7,941,408 B2 | Page 1 of 1 |
| APPLICATION NO. | : 10/934079 | |
| DATED | : May 10, 2011 | |
| INVENTOR(S) | : Sinha et al. | |

It is certified that error appears in the above-identified patent and that said Letters Patent is hereby corrected as shown below:

In column 7, line 24, delete "BEWEEN" and insert -- BETWEEN --, therefor.

In column 10, line 31, delete "ca be" and insert -- can be --, therefor.

In column 17, line 11, delete "'row id" and insert -- 'row_id --, therefor.

In column 20, line 17, delete "generate" and insert -- Generate --, therefor.

In column 23, line 26, in Claim 1, delete "item" and insert -- item; --, therefor.

In column 24, line 49, in Claim 24, delete "more the" and insert -- more --, therefor.

Signed and Sealed this
Fourth Day of October, 2011

David J. Kappos
*Director of the United States Patent and Trademark Office*